US007441495B2

(12) United States Patent
Hallé et al.

(10) Patent No.: US 7,441,495 B2
(45) Date of Patent: Oct. 28, 2008

(54) SYSTEMS USEFUL FOR BEVERAGE MAKING MACHINES

(75) Inventors: Patrick Hallé, Laval (CA); Robert Declos, Saint-Hyacinthe (CA); Patrick Brazeau, LeGardeur (CA); Martin Harnois, Sainte Julie (CA); Pascal Grenier, Iberville (CA); Denis Haché, Beloeil (CA); Joé Normandeau, Delson (CA); André Gauthier, St-Bruno-de-Montarville (CA); Roger Bourgouin, Saint-Hubert (CA); Stephen Grant, Montreal (CA); Réjean Bouiliane, Carignan (CA); Eric Thériault, Chambly (CA)

(73) Assignee: VKI Technologies, Inc., Saint-Hubert, Quebec (CA)

( * ) Notice: Subject to any disclaimer, the term of this patent is extended or adjusted under 35 U.S.C. 154(b) by 0 days.

(21) Appl. No.: 11/493,106

(22) Filed: Jul. 26, 2006

(65) Prior Publication Data

US 2006/0261085 A1 Nov. 23, 2006

Related U.S. Application Data

(62) Division of application No. 10/705,411, filed on Nov. 10, 2003, now abandoned.

(30) Foreign Application Priority Data

Nov. 8, 2002 (CA) .................................... 2411809

(51) Int. Cl.
*A47J 31/00* (2006.01)
(52) U.S. Cl. .............................. 99/295; 99/299; 141/351
(58) Field of Classification Search ................ 141/255, 141/301, 349–351, 369; 99/295, 299
See application file for complete search history.

(56) References Cited

U.S. PATENT DOCUMENTS

| 2,183,837 | A |   | 12/1939 | Hamilton et al. |
|-----------|---|---|---------|----------------|
| 2,911,901 | A |   | 11/1959 | Totten et al. |
| 3,046,869 | A |   | 7/1962  | Reynolds |
| 3,072,299 | A |   | 1/1963  | Colell |
| 3,586,214 | A |   | 6/1971  | Diebel |
| 3,682,090 | A |   | 8/1972  | Meriggi |
| 4,191,101 | A |   | 3/1980  | Ogawa et al. |
| 4,357,861 | A |   | 11/1982 | Di Girolamo |
| 4,541,552 | A |   | 9/1985  | Scheithauer |
| 4,665,808 | A |   | 5/1987  | Pulvermuller |
| 5,133,247 | A | * | 7/1992  | Pastrick ...................... 99/295 |
| 5,421,491 | A |   | 6/1995  | Tuvim et al. |

(Continued)

FOREIGN PATENT DOCUMENTS

| CA | 1144117      | 5/1983 |
|----|--------------|--------|
| EP | 0 331 271 A1 | 9/1989 |
| EP | 0 640 311 A1 | 3/1995 |
| EP | 1 224 894 A18 | 7/2002 |

(Continued)

*Primary Examiner*—Timothy L Maust
(74) *Attorney, Agent, or Firm*—Fay Sharpe LLP

(57) ABSTRACT

Various systems are provided which may be used in a beverage machine for dispensing one or more, (in particular a plurality of) beverage types. A beverage machine may thus comprise one or more systems selected from the group consisting of
 i) a conveyance system for the dispensing of particulate material;
 ii) a beverage selection system providing for the possibility of selecting from among a class of beverages; and
 iii) a hot water dispensing system which may have a system for detecting the absence of water in the fluid conduit component thereof.

32 Claims, 19 Drawing Sheets

U.S. PATENT DOCUMENTS

| | | | |
|---|---|---|---|
| 5,791,526 A | 8/1998 | Landais et al. | |
| 5,957,036 A * | 9/1999 | Warner et al. | 99/299 |
| 6,289,948 B1 | 9/2001 | Jeanin et al. | |
| 6,450,371 B1 | 9/2002 | Sherman et al. | |
| 6,571,686 B1 * | 6/2003 | Riley et al. | 99/299 |
| 2002/0096054 A1 | 7/2002 | Schob | |

FOREIGN PATENT DOCUMENTS

| | | |
|---|---|---|
| WO | WO 95/07041 | 3/1995 |
| WO | WO 00/38558 | 7/2000 |
| WO | WO 00/44268 | 8/2000 |
| WO | WO 00/64318 | 11/2000 |

* cited by examiner

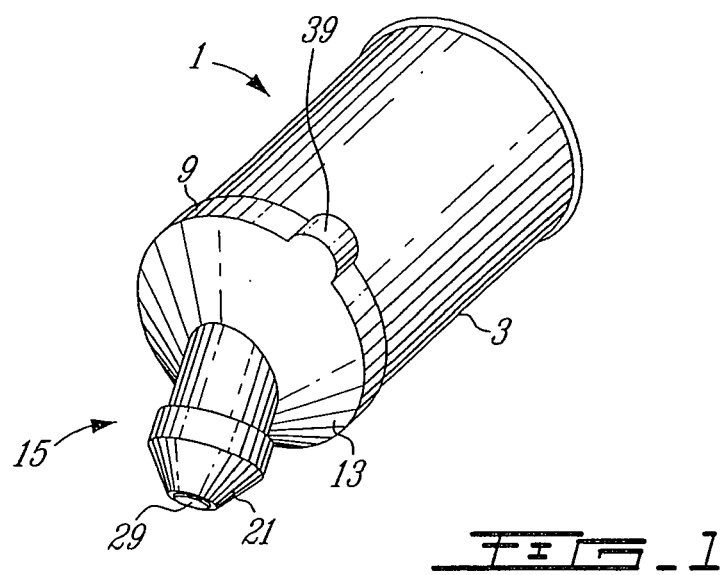
FIG_1
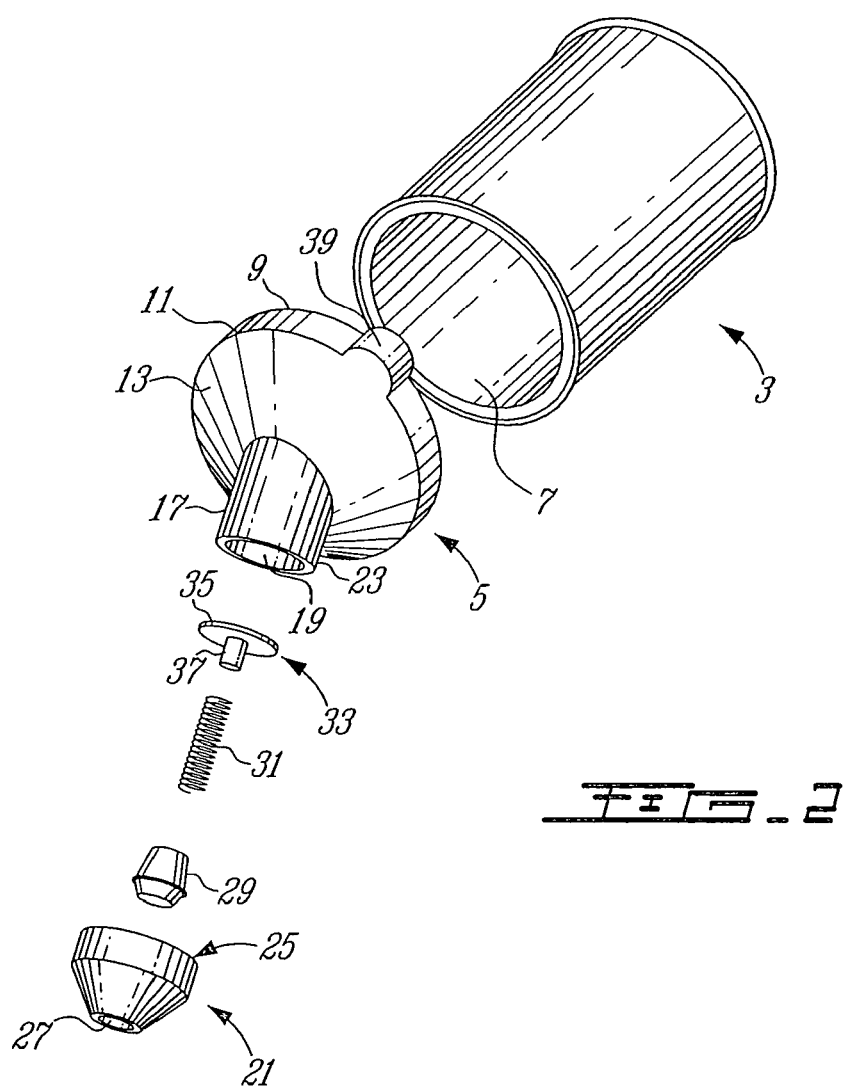
FIG_2

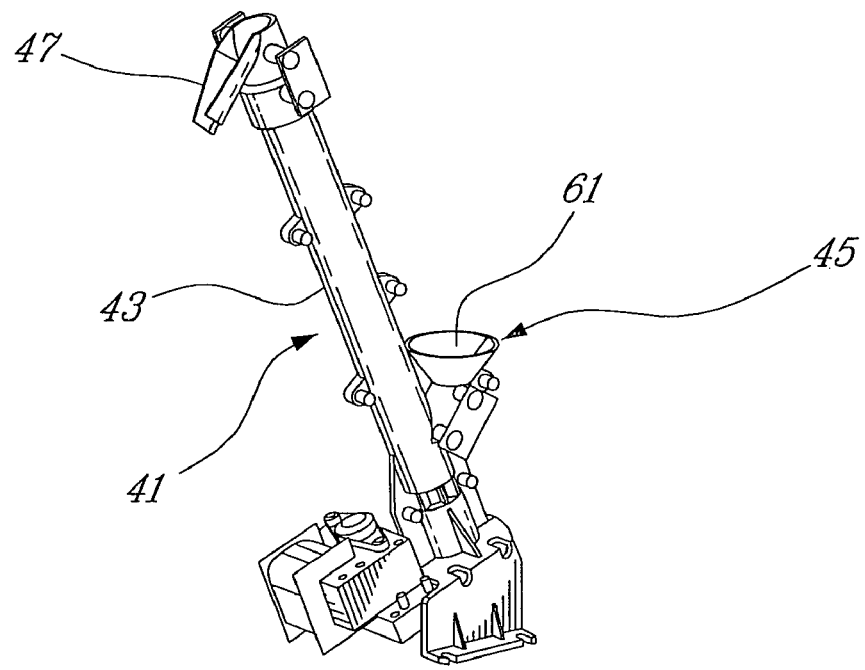
FIG_3
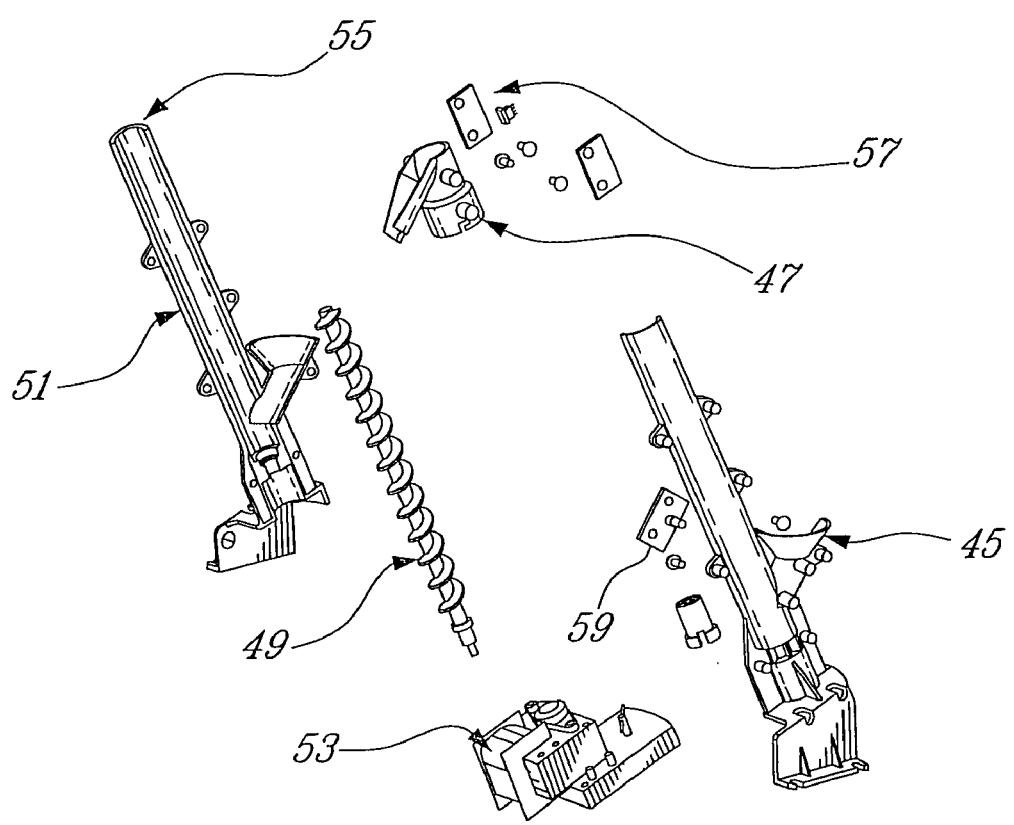
FIG_4

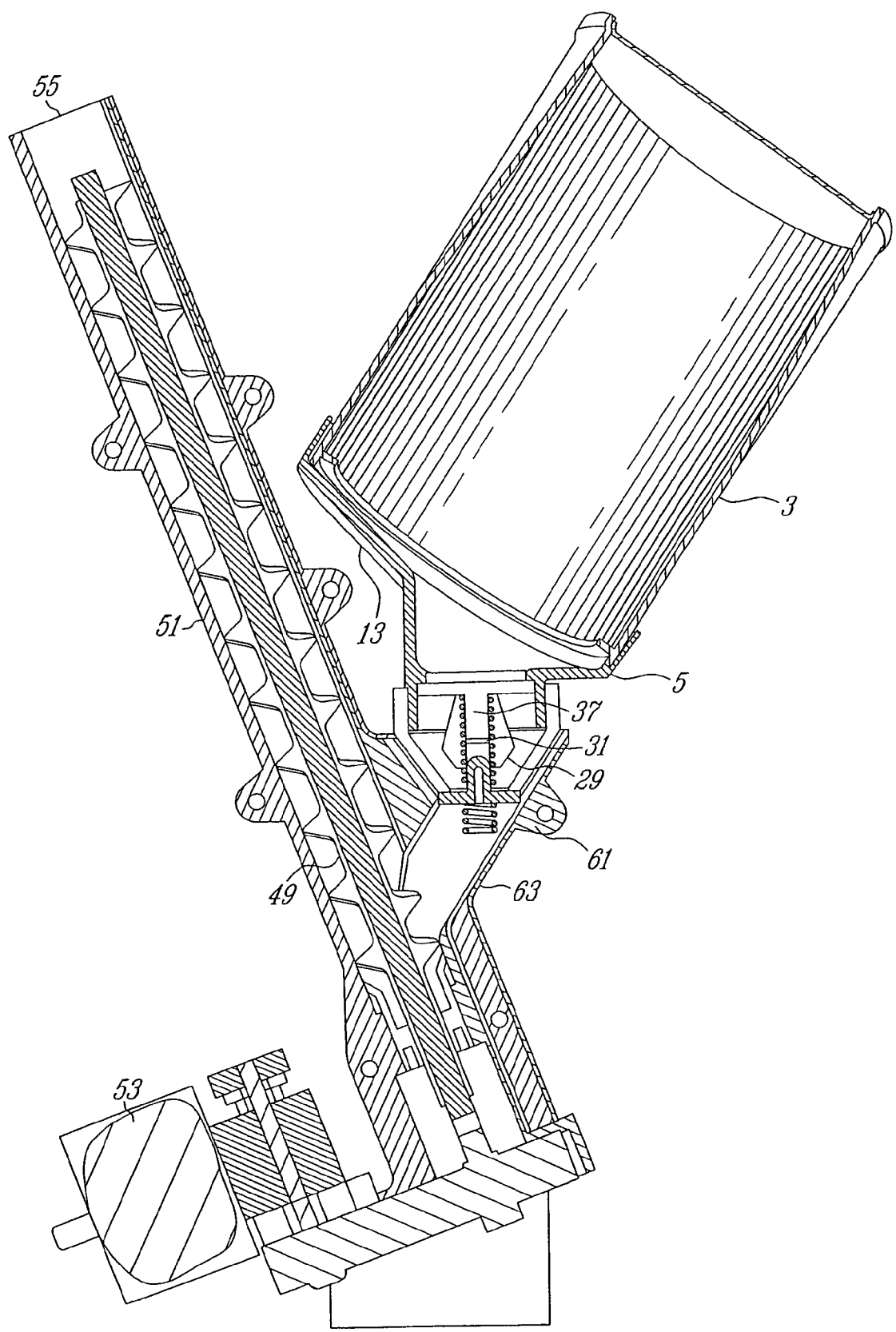

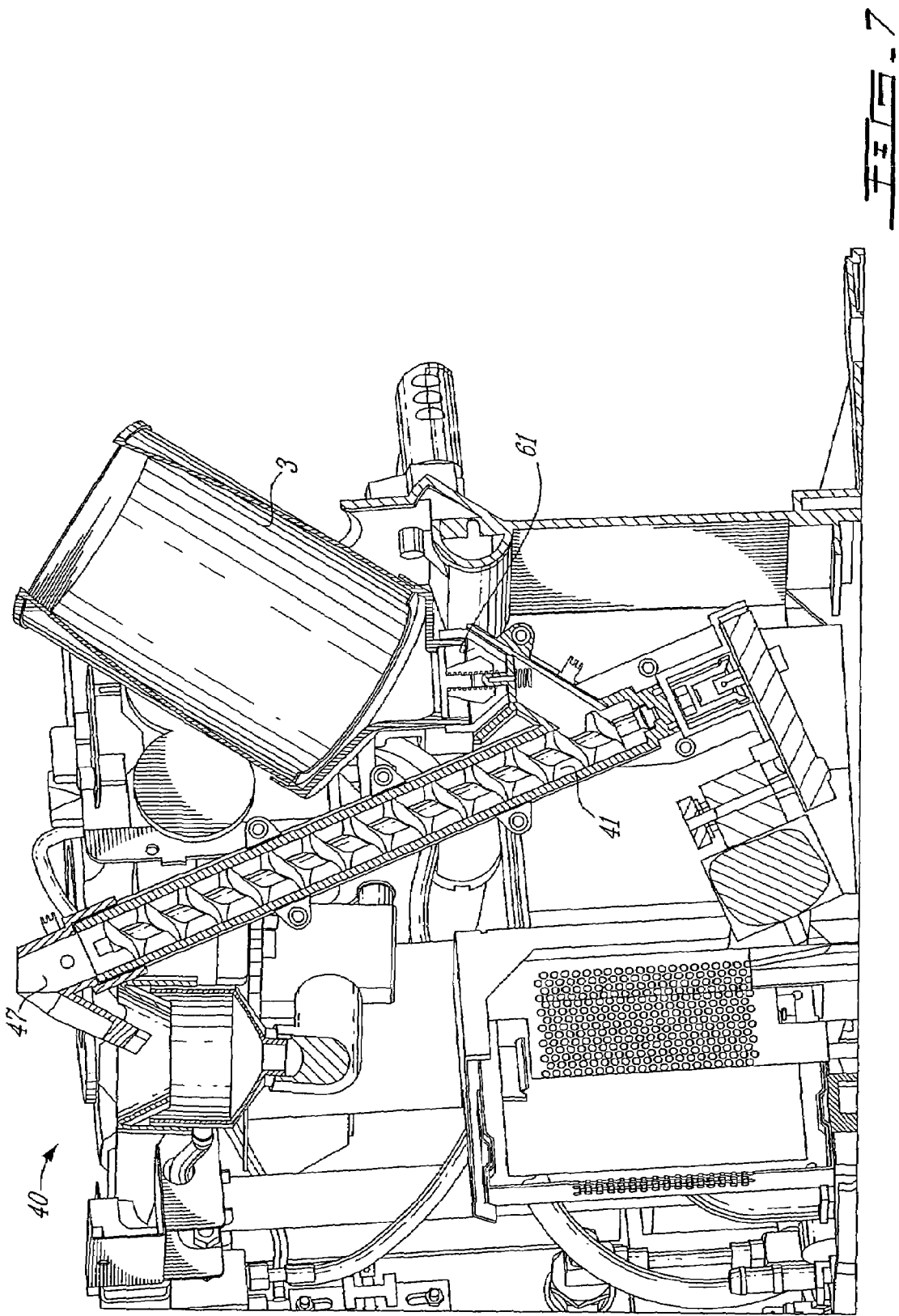

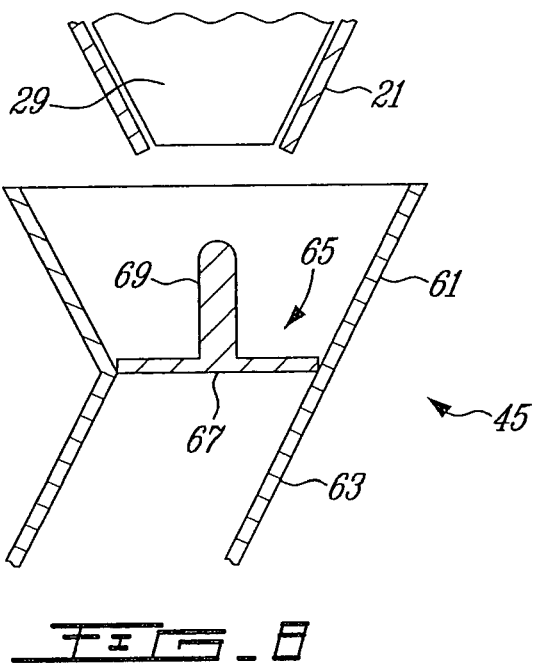
FIG_8
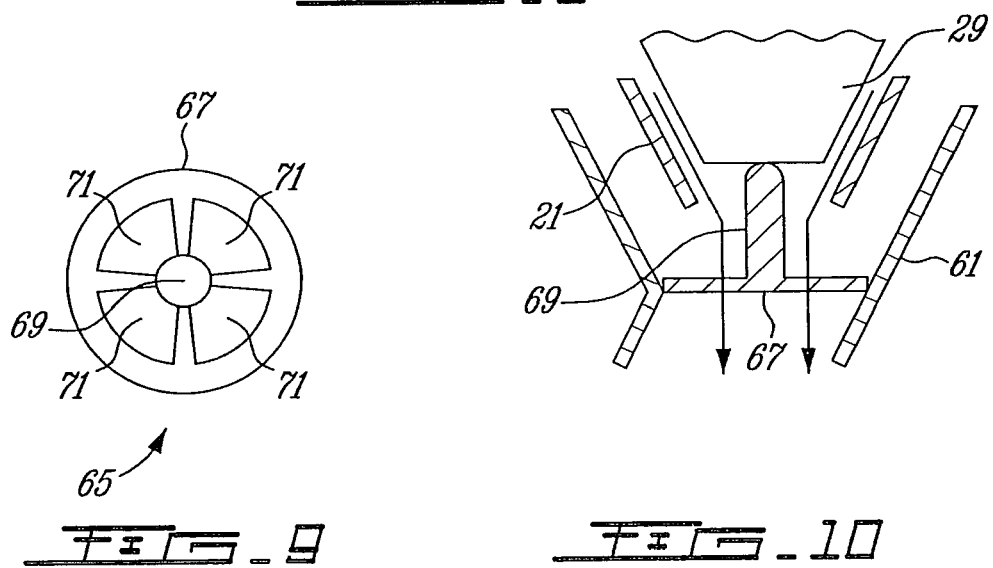
FIG_9  FIG_10
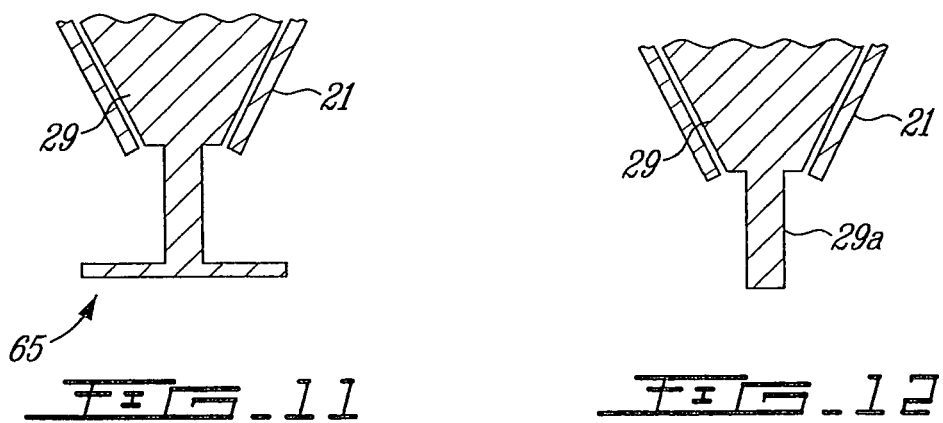
FIG_11  FIG_12

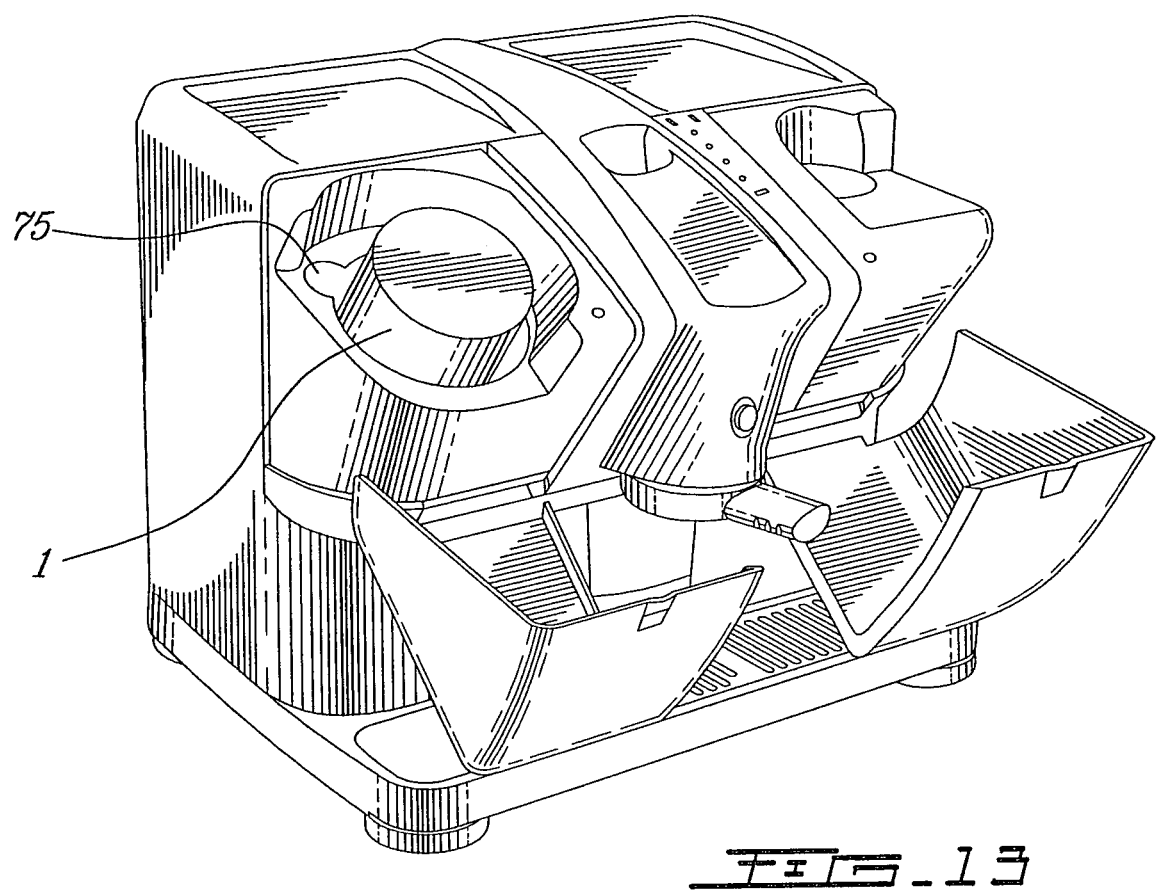
FIG_13
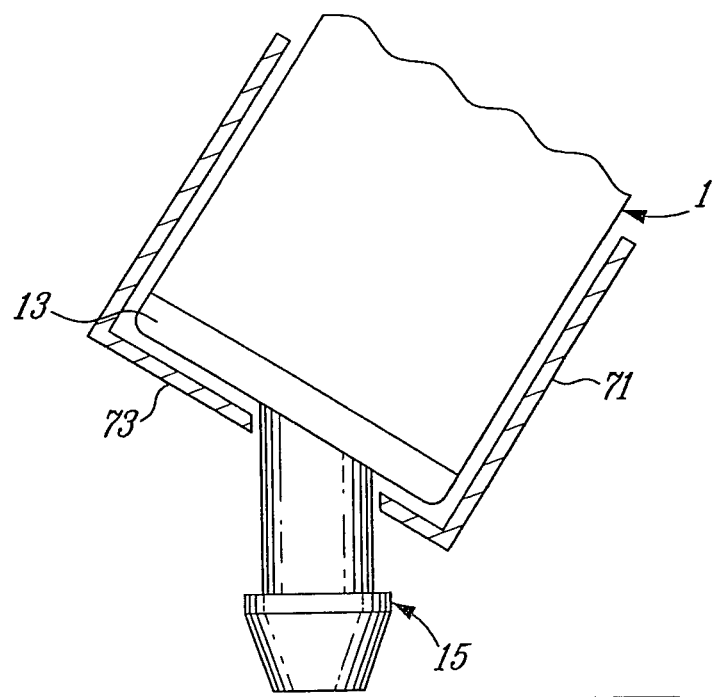
FIG_14

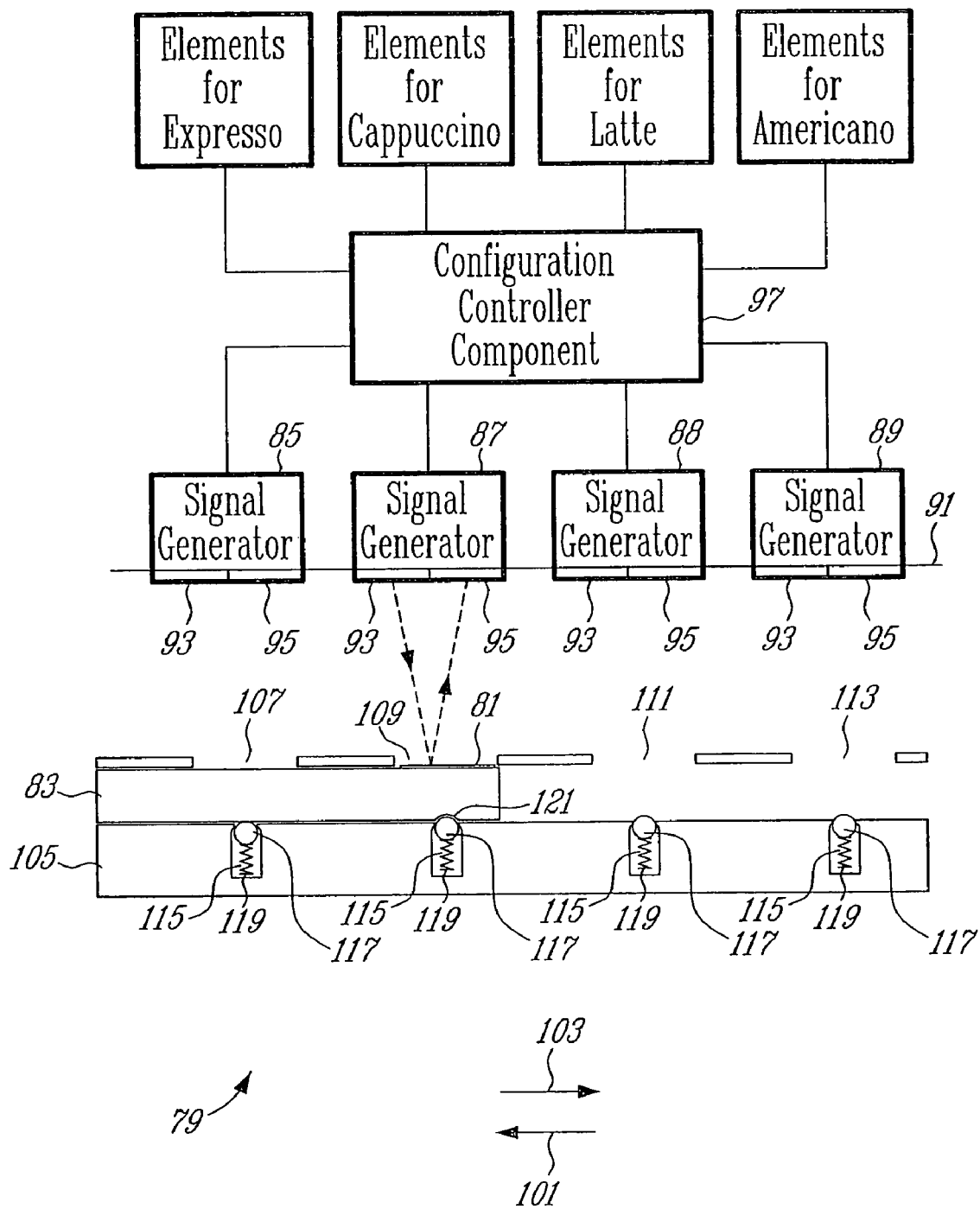

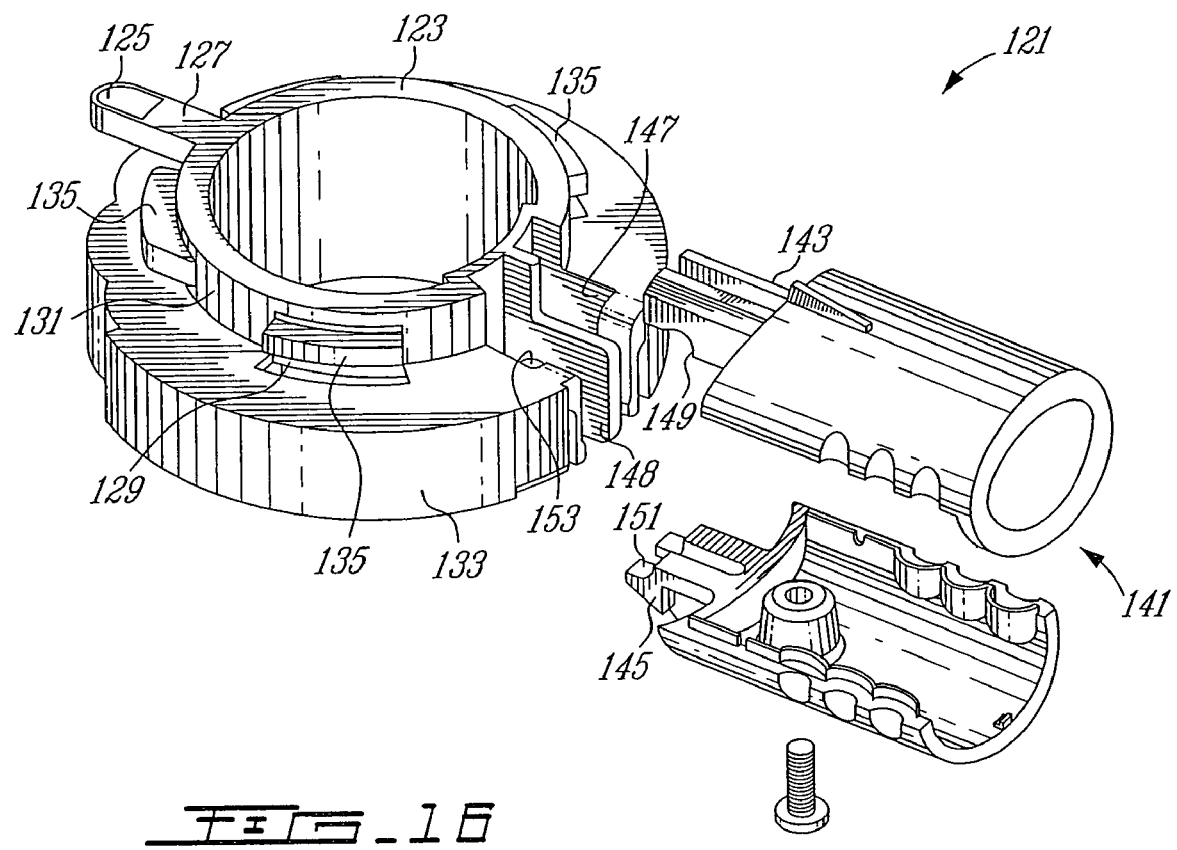
FIG_16
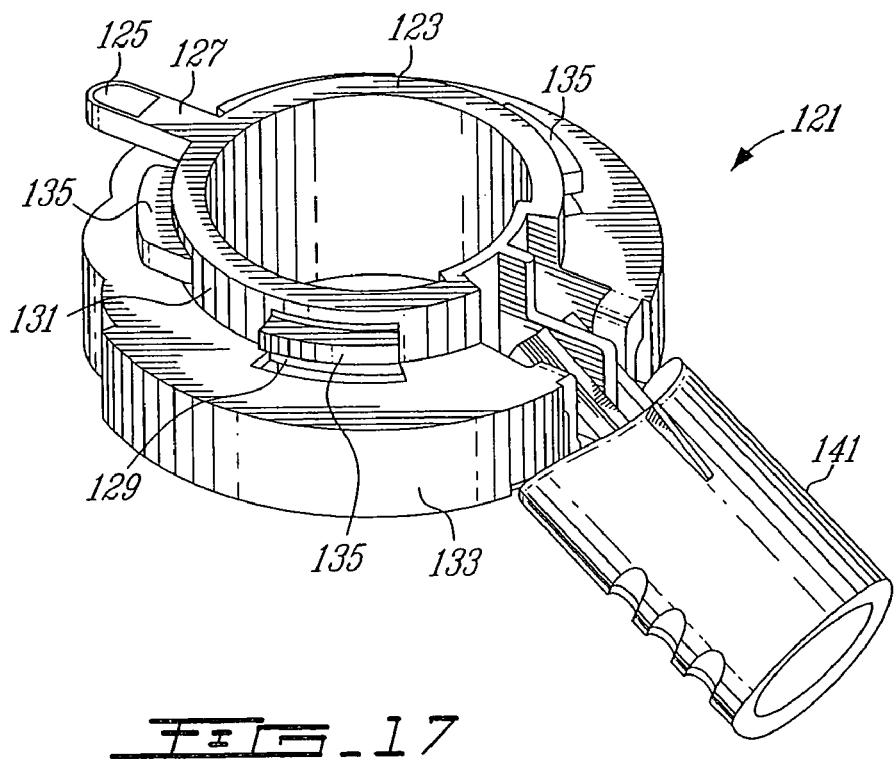
FIG_17

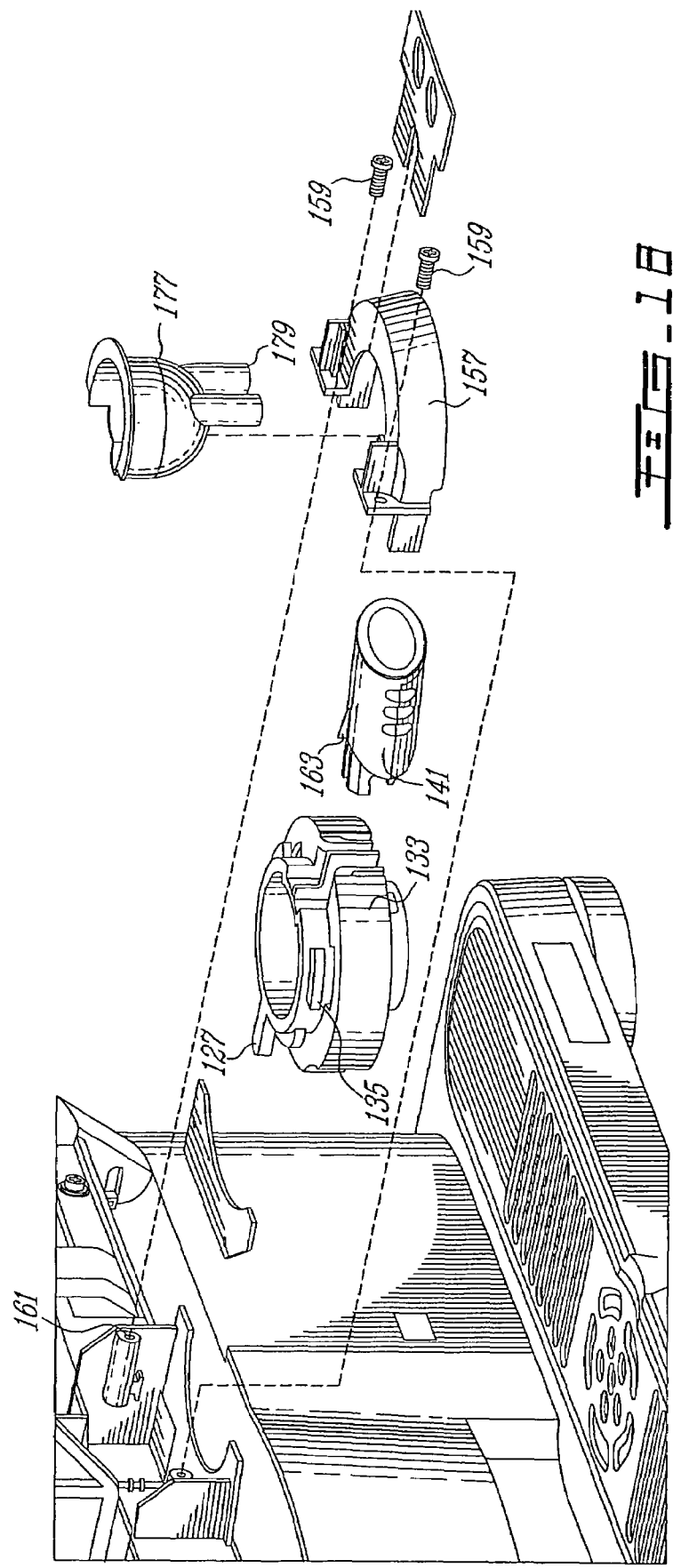

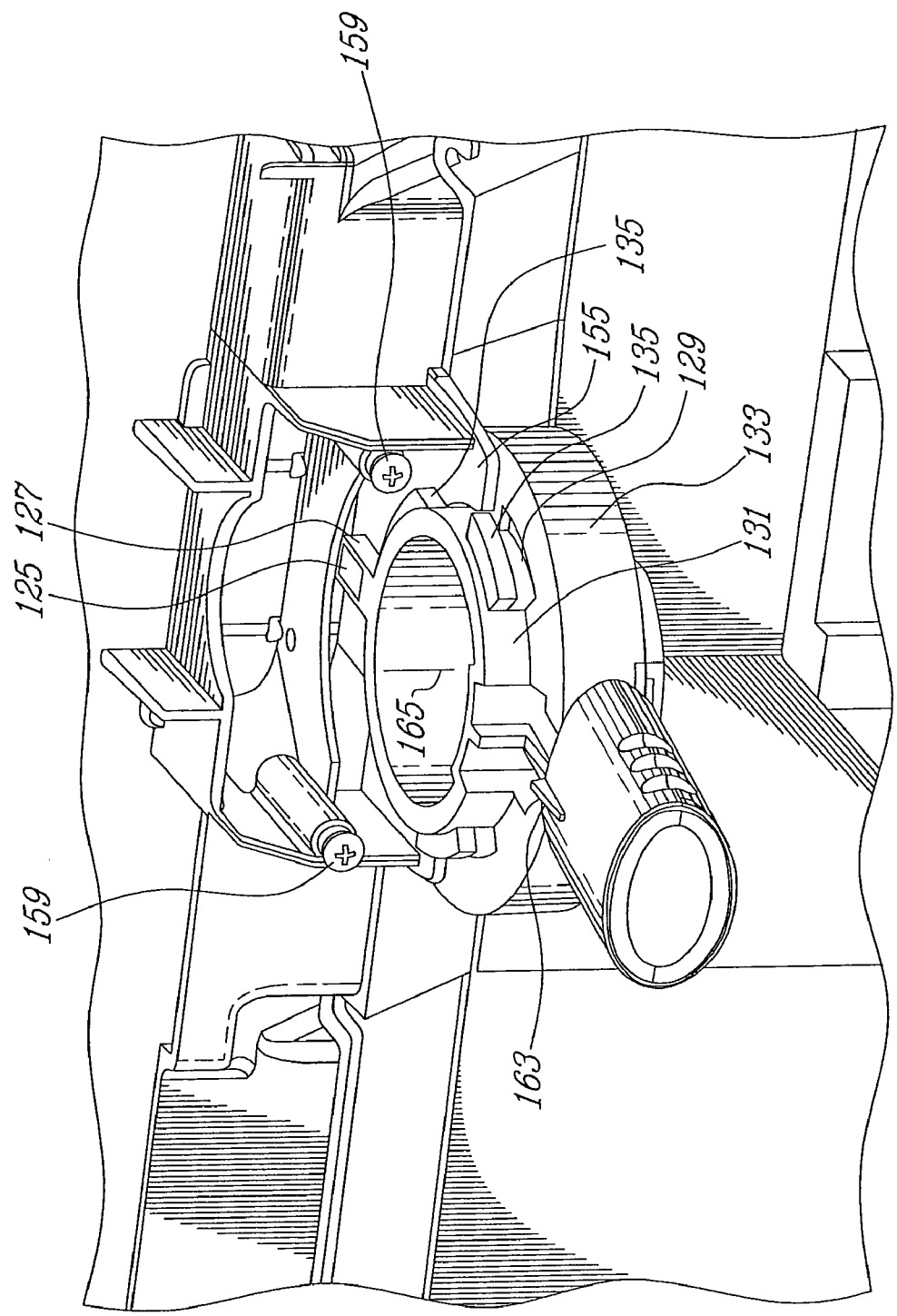

FIG_26

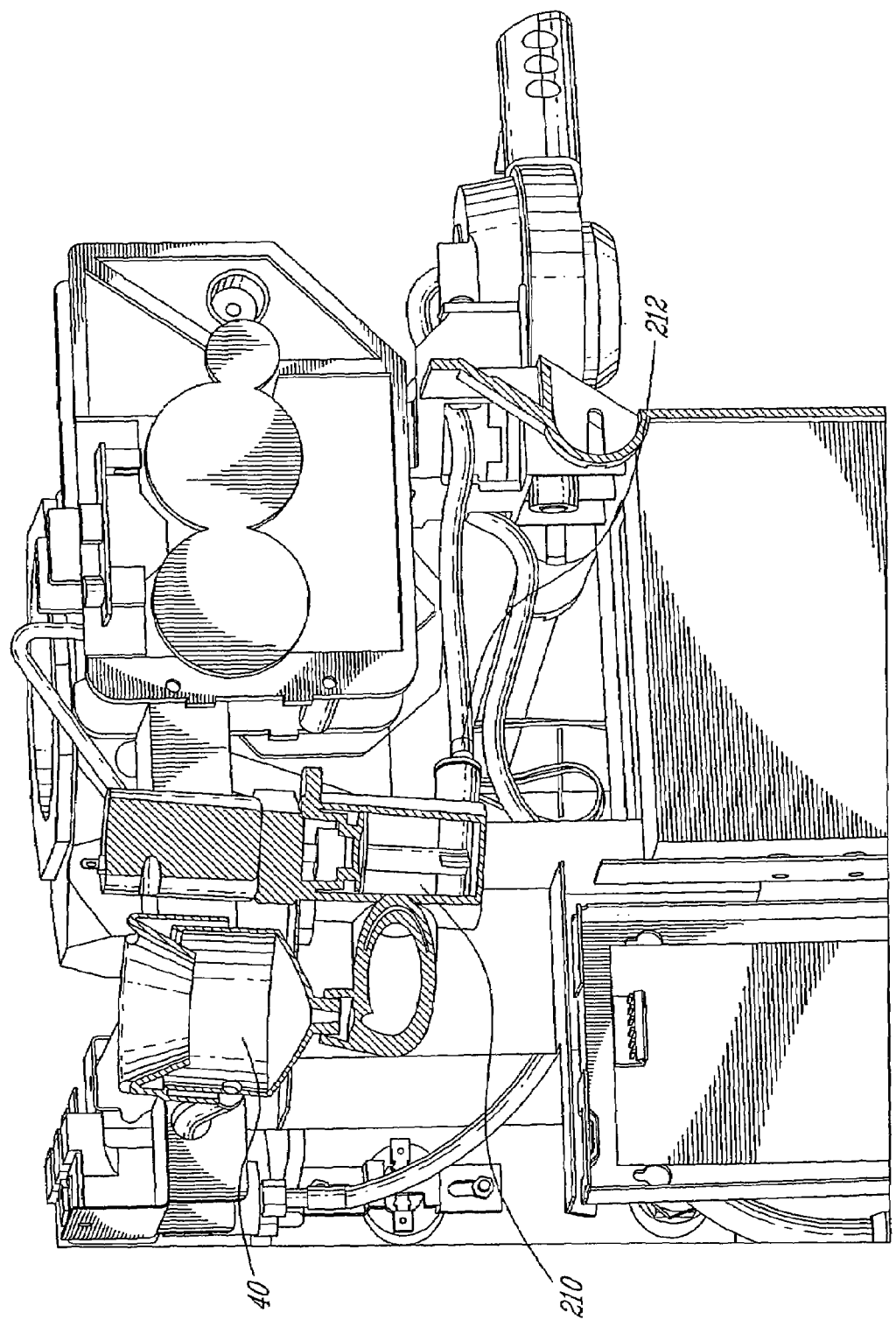

SYSTEMS USEFUL FOR BEVERAGE MAKING MACHINES

Priority is hereby claimed under § 119 or 365(a) or 365(b) to Foreign Patent Application No. 2,411,809, filed Nov. 8, 2002 in Canada. This application is a divisional patent application of the parent application U.S. Ser. No. 10/705,411 filed Nov. 10, 2003 now abandoned, entitled Systems Useful for Beverage Making Machines, invented by Patrick Halle, et al., the disclosures of which are incorporated herein by reference.

The present invention relates to systems, assemblies, combinations, etc. which may be incorporated into beverage making machines, for example (automatic) beverage making machines and in particular beverage making machine able to provide a selection of two or more beverage types.

The present invention will be discussed in relation to coffee beverages but is applicable generally to any beverage making machine which is able to provide any type of beverage in addition to or in the alternative to coffee beverages, (e.g. tea, herbal tea, milk, chocolate milk hot chocolate drink, soft drinks, etc.). Although the present invention will be discussed in particular with respect to a machine which may provide a choice between a number of beverages various aspect such as the storage aspect and water heater may be used in a machine offering a single choice of beverage.

Beverage machines are known which exploit particulate substances for the preparation of a beverage; such particulate substances may be used for the preparation of the base beverage itself (e.g. coffee, tea, milk, etc.), such particulate substances may also used be for the exploitation of a (soluble) flavor additive substance such powdered milk, sugar, cocoa, etc. There is a continuing need for alternative means for storage and/or dispensing of such particulate substance.

Beverage machines (e.g. automatic beverage machine) are also known which are able to provide individual servings of a beverage which is selectable from among a plurality of beverage types. Various beverages including hot or cold coffee, tea, hot chocolate, and cold soda; known machines also permit the consumer to choose from a variety of items to add to the beverage to alter the flavor of the drink (e.g. milk).

U.S. patent publication no. US 2002/00960054 (U.S. application Ser. No. 10/046,662), for example describes, in relation to a coffee beverage machine, the replacement of a plurality of push button (i.e. contact) type selection mechanisms, by a rotary contact selection mechanism. The rotary switch contact selection mechanism is configured such that it may be rotated between a plurality of releasably lockable positions, each position being associated with a switch contact group which in turn is associated with the preparation of a particular beverage type.

There is still nevertheless a continuing need for a selection process or mechanism whereby mechanical contact(s) or connections may be avoided in order to activate or de-activate electrical connections (i.e. circuits.) which may in turn be subsequently energized to initiate a specific beverage preparation operating cycle associated with the preparation of a specific beverage.

Hot water dispensing systems are also known for use with machines for the preparation of beverages. Such a system may include among other things a hot water heater, a pump for displacing water to and from the water heater, fluid conduits, valves etc. Such a system may break down and leak water to the point where the heater and pump may inadvertently be called upon to function in the absence of water which could lead to significant damage to parts of the system (e.g., due to overheating). There is a continuing need for means for detecting such absence of water parts or all of a hot water system Accordingly, it would be advantageous to have a relatively easily exploitable system for storage and/or dispensing or displacement of particulate substance(s) which may be used to prepare a beverage(s).

It would also be advantageous to have a beverage selection system which limits the need to use mechanical contacts for the initial selection process.

It would further be advantageous to have a system for detecting the absence of water in the fluid flow paths of a hot water dispensing system.

It would additionally be advantageous to have a beverage preparation machine which could incorporate one or more of the above mentioned systems.

SUMMARY OF INVENTION

In accordance with one aspect the present invention relates to a lid, namely to a removable or detachable valved lid element for covering an opening of a case element
  i) said lid element being configured to co-operate with said case element such that said lid element is removably attachable to said case element so as to cover said opening and form an enclosed space (e.g. chamber) for containing a particulate substance (e.g., cocoa, a particulate milk substance such as for example powdered milk, etc. ),
  ii) said lid element comprising a valve member having an outflow aperture and defining a flow path for the flow of particulate material out of said enclosed space, said valve member further comprising a plug element and a bias component, said plug element and said bias component being configured such that said plug element is displacable between a closed position and an open position whereby when said plug element is in said closed position said plug closes off said outflow aperture whereby particulate material (e.g., powder) is unable to flow out of said enclosed space (e.g., chamber) through said outflow aperture and when said plug element is in said open position particulate material (e.g., powder) is able to flow out of said enclosed space (e.g., chamber) through said outflow aperture, said bias element biasing said plug element in said closed position.

In accordance with the present invention a valved lid element may (itself) comprise a valve plug interaction element for releasably maintaining (i.e., for urging) said plug in said open position (i.e., against said bias element).

In accordance with the present invention the lid and case elements may be of any material keeping in mind the purpose thereof (i.e., to provide a free gravity induced flow of particles out of the case element). The case element may have wall(s) at least in the area adjacent to the opening which are rigid in the sense of being self-supporting (can stand up alone under the influence of gravity) as against a wall structure(s) which is not self-supporting, i.e. collapsible under the influence of gravity. The case element may have a cylindrical or tubular aspect (i.e., form). The lid element may have any suitable attachment structures for removably attaching the lid element to the case element, screw threads, friction fit members, L-shaped slot for engaging a pin, a pin for engaging an L-shaped slot, etc.

In accordance with one aspect the present invention relates to a particulate storage [assembly or] combination (i.e. cartridge) comprising i) a case element having an opening and ii) a (removable or) detachable valved lid element said case element and said lid element being configured such that said lid element is removably attached(able) to said case element so as to cover said opening and form an enclosed space (e.g., chamber) for containing a particulate substance (e.g., a particulate milk substance such as for example powdered milk), i) said lid element comprising a valve member having an outflow aperture and defining a flow path for the flow of particulate material out of said enclosed space, said valve member further comprising a plug element and a bias component, said plug element and said bias component being configured such that said plug element is displacable between a closed position and an open position whereby when said plug element is in said closed position said plug closes off said outflow aperture whereby particulate material (e.g., powder) is unable to flow out of said enclosed space (e.g., chamber) through said outflow aperture and when said plug element is in said open position particulate material (e.g., powder) is able to flow out of said enclosed space (e.g., chamber) through said outflow aperture, said bias element biasing said plug element in said closed position.

In accordance with the present invention the valve member may be a valved spout member.

In accordance with the present invention, the lid element may comprise an orientation guide means.

In accordance with the present invention the enclosed space may contain a particulate substance, such as for example a particulate milk substance; it is to be understood herein that the expression "particulate milk substance" refers not only to a substance derived directly from milk but also a substance from naturally and/or artificially derived materials.

In accordance with the present invention a storage combination may comprise a valve plug interaction element for releasably maintaining (i.e., for urging) said plug in said open position (i.e., against said bias element).

In accordance with another aspect the present invention relates to a conveyance system (or assembly) for (the automatic) conveying a particulate substance from a removable particulate storage component to a predetermined station (e.g., a mixing station (e.g, into a mixing receptacle for mixing an aqueous substance (e.g., water) with the particulate substance)), wherein said removable particulate storage component comprises a valved wall element and is configured to define (i.e., form) an enclosed space (e.g., chamber) for containing a particulate substance (e.g., a particulate milk substance such as for example powdered milk), said valved wall element comprising a valve member defining an outflow aperture for providing a flow path for the flow of particulate material out of said enclosed space (e.g., chamber), said valve member further comprising a plug element and a bias element, said plug and bias elements being configured such that said plug is displacable between a closed position and an open position whereby when said plug is in said closed position said plug closes off said outflow aperture whereby particulate substance (e.g., powder) is unable to flow out of said enclosed space (e.g., chamber) through said outflow aperture and when said plug is in said open position particulate substance (e.g., powder) is able to flow out of said enclosed space (e.g., chamber) through said outflow aperture, said conveyance system comprising comprising a particulate delivery component, wherein said particulate delivery component comprises a conveyor element for conveying particulate substance from the replaceable particulate storage component to said predetermined station, and wherein said particulate delivery component further comprises an interconnect element for releasably interconnecting the conveyor element and the outflow aperture of said valve member for the flow of particulate substance through the outflow aperture to the conveyor element.

In accordance with the present invention a conveyance system may comprise a particulate delivery component which comprises a valve plug interaction element for releasably maintaining (i.e., for urging) the plug element of said valve member in said open position (i.e., against said bias element).

In accordance with the present invention a conveyance system may further comprise a support component, wherein said support component is configured for releasably engaging said removeable storage component such that the storage component is oriented so that the valved wall member at least partially forms the bottom of the so engaged storage component (i.e., for the free flow (i.e., gravity induced flow) of particulate substance from the enclosed space).

In accordance with the present invention a conveyance system may comprise a removeable particulate storage component as described herein.

In accordance with another aspect, the present invention relates to a beverage selection system (or assembly) for an automatic beverage machine for dispensing a beverage selectable from a plurality of beverage types (or varieties), said selection system comprising a configuration controller component, a plurality of switch configuration elements, and a switch selection element, characterized in that said switch selection element comprises a light reflection member, each of said switch configuration elements comprises a light detection component comprising a light emitter means for providing light for reflection from said light reflection member as reflected light, and a light detector means for detecting said reflected light from said light reflection member each of said switch configuration elements is configured to pass from a first state to a second state in response to detection of said reflected light and to pass from said second state to said first state in response to the non-detection of said reflected light, each switching element being connected to the configuration controller component (e.g., comprising an electronic computer element such as a microprocessor), the configuration controller component being able (i.e., configured ) to recognize (i.e., detect) when a switch element is in said second state and being able to initiate the configuration of the beverage machine for (i.e., uniquely) dispensing the beverage type associated with such switch element, and said switch configuration elements and said switch selection element being configured and disposed such that said light reflection member and said light detection components are displaceable relative to each other between a plurality of releasably lockable positions such that each such lockable position associates the light reflection member with the light detection component of a respective switch element.

In accordance with the present invention a light reflection member may be configured and be of any suitable material keeping in mind its function, namely, to reflect light back to the light detection component(s).

In accordance with the present invention a system is provided wherein said light reflection member is displaceable between a plurality of releasably lockable positions, said light reflection member and said light detection components being configured and disposed such that each such lockable position associates the light reflection member with the light detection component of a respective switch element.

In accordance with the present invention a selection system is provided wherein the light reflection member may be an infrared light reflection member and the light detection component of each of said switch elements may be an infrared detection component comprising an infrared emitter means for providing infrared light for reflection from said light reflection member as reflected infrared light, and an infrared light detector means for detecting said reflected infrared light from said infrared light reflection member.

In another aspect the present invention relates to a hot water dispenser assembly or system which may be used or associated with a beverage making machine. The hot water dispenser system may comprise a water reservoir; a pump (e.g., electric) for delivering water from the water reservoir to a water heater for producing hot water (the hot water may for example be under a predetermined pressure due to temperature of water and/or pressure induced by the upstream pump), the water heater comprising heating means for heating water to a predetermined temperature; and selectively operable discharge means associated with hot water heater, said discharge means having one or a plurality of outlets directing hot water to a predetermined location(s) or station(s).

Thus in accordance with a further aspect the present invention relates to a hot water dispenser system (or assembly) comprising:

a valve assembly
a hot water component for producing hot water,
a fluid conduit component providing fluid communication between said hot water component and said valve assembly
said valve assembly comprising a one or more (e.g., two or more e.g. three) selectively operable solenoid valves, each solenoid valve being in fluid communication with said hot water component for selectively directing hot water from said hot water component through a respective conduit branch to a predetermined station (e.g., brewing station, discharge station, mixing station, etc.).
said hot water component comprising a hot water heater and a pump for the displacement of water from said hot water heater through said valve assembly to a predetermined station and
a malfunction sensing component configured for sensing the absence of water in said fluid conduit component (i.e., lack of water being indicative of a malfunction in the hot water system) (i.e., indicative of lack of sufficient water in heater and/or pump) and for generating in response to the absence of water a signal indicative of the absence of water.

In accordance with the present invention a malfunction sensing component may for example comprise the fluid conduit component providing fluid communication between said hot water component and said valve assembly as well as a signal generator. In this case, a body of a valve may be metallic and thus be electrically conductive. On the other hand, the fluid conduit component immediately downstream of the valve body may over a predetermined length or part thereof be of a plastic type material which is a non-conductor of electricity; the non-conductive part terminating at and being connected to a conductive conduit part. The body of the valve and the conductive conduit part may be connected to a water detector which comprises the signal generator; the generator may be of any suitable (known) type keeping in mind its function. The water present in the conduit between the body of the valve and the conductive conduit part acts as a signal conductor such that if no water is present the signal link between the valves will be broken. The water detector may also includes a signal detection element configured (in any suitable way) to detect the absence such signal and in such case generate a further (electric) signal indicative of the absence of water, this further signal being sent to an LED so as to alert the user of the assembly; alternatively the further signal may be sent to the controller means to disconnect the pump and electric heater form the power source since the operation of these elements in the absence of water could lead to their damage.

In accordance with the present invention there is further provided a hot water dispenser system (or assembly) comprising:

a multi-way valve assembly
a hot water component for producing hot water,
a fluid conduit component providing fluid communication between said hot water component and said multi-way valve assembly
said multi-way valve assembly comprising a one or more (e.g., two or more e.g. three) of selectively operable solenoid valves, each solenoid valve being in fluid communication with said hot water component for selectively directing hot water from said hot water component through a respective conduit branch to a predetermined station (e.g., brewing station, discharge station, mixing station, etc.).
said hot water component comprising a hot water heater and a pump for the displacement of water from said hot water heater through said multi-way valve assembly to a predetermined station and
a malfunction sensing component for sensing the absence of water in said fluid conduit component (i.e., lack of water being indicative of a malfunction in the hot water system) (i.e., indicative of lack of sufficient water in heater and/or pump) and for generating in response to the absence of water a signal indicative of the absence of water.

In accordance with the present invention a hot water dispensing system may comprise a flow rate measuring device for sensing the amount of water being dispensed.

In a further aspect the present invention relates to a beverage machine (e.g., of automatic type) for dispensing one or more (in particular a plurality on, beverage types. The beverage type may take on any desired form; the beverages may, for example, be different types of coffee beverage, and may as desired comprise milk, tea, herbal tea, hot chocolate milk, etc. The beverage machine may for example comprise a beverage selection component, a particulate storage component for particulate material(s) for the preparation of a beverage(s), a particulate delivery component for delivery of particulate substance(s) to various stations such as for example to a brewing station or a mixing station (e.g., station for the preparation of a milk substance by mixing (hot) water with a particulate milk substance such a powdered milk), an aqueous medium (e.g., hot water, milk, etc.) to a brewing station, mixing station, dispensing station, etc., a beverage withdrawal component whereby beverage may be delivered to a mixing station, dispensing station, etc., a controller component for controlling the beverage preparation cycle in response to the beverage selection component. The beverage machine may be characterized in that said beverage machine may comprise one or more systems selected from the group consisting of i) a conveyance system as described herein;

ii) a beverage selection system as described herein; and iii) a hot water dispensing system as described herein.

A beverage machine may if desired incorporate one or more of the systems or parts thereof as described herein.

In accordance with the beverage selection system or assembly of the present invention a reference the word "light" is to be understood as being a reference to both visible and invisible light. The invisible light may for example be infrared light or radiation (sometimes referred to herein simply as "infrared"), ultra violet light or radiation (sometimes referred to herein simply as "ultraviolet"). The light may, for example, also be "laser" type light. In any event, the light is to be chosen as well as exploited on the basis such exploitation will not be an unacceptable hazard for a user of a system as described herein.

In accordance with the present invention, there is provided a detachable valved lid element for covering an opening of a case element the lid element being configured to co-operate with said case element such that the lid element is removably attachable to the case element so as to cover the opening and form an enclosed space for containing a particulate substance, the lid element comprising a valve member having an outflow aperture and defining a flow path for the flow of particulate material out of the enclosed space, the valve member further comprising a plug element and a bias component, the plug element and the bias component being configured such that the plug element is displacable between a closed position and an open position whereby when the plug element is in the closed position the plug closes off the outflow aperture whereby particulate material is unable to flow out of the enclosed space through the outflow aperture and when the plug element is in the open position particulate material is able to flow out of the enclosed space through the outflow aperture, the bias element biasing the plug element in the closed position.

In accordance with the present invention, there is provided a lid element as defined above, wherein said orientation guide means comprises an orientation guide projection.

In accordance with the present invention, there is provided beverage machine for dispensing a beverage, the beverage machine comprising a mixing station communicating with a dispensing station, a particulate delivery component for delivery of particulate substance from a removable particulate storage component to the mixing station, and an aqueous medium delivery means for delivering aqueous medium to the mixing station, wherein said removable particulate storage component comprises a valved wall element and is configured to define an enclosed space for containing a particulate substance, the valved wall element comprising a valve member defining an outflow aperture for providing a flow path for the flow of particulate material out of the enclosed space, the valve member further comprising a plug element and a bias element, the plug and bias elements being configured such that the plug is displacable between a closed position and an open position whereby when the plug is in the closed position the plug closes off the outflow aperture whereby particulate substance is unable to flow out of the enclosed space through the outflow aperture and when the plug is in the open position particulate substance is able to flow out of the enclosed space through the outflow aperture, characterized in that the beverage machine comprises a conveyance system, wherein the conveyance system comprises the particulate delivery component, wherein the particulate delivery component comprises a conveyor element for conveying particulate substance from the replaceable particulate storage component to the mixing station, and wherein the particulate delivery component further comprises an interconnect element for releasably interconnecting the conveyor element and the outflow aperture of the valve member for the flow of particulate substance through the outflow aperture to the conveyor element.

In accordance with the present invention, there is provided a beverage machine as defined above wherein the particulate delivery component comprises a valve plug interaction element for releasably maintaining maintaining the plug element of the valve member in said open position.

In accordance with the present invention, there is provided a beverage machine as defined above, wherein the conveyance system further comprises a support component, and wherein the support component is configured for releasably engaging the removeable storage component such that the storage component is oriented so that the valved wall member at least partially forms the bottom of the so engaged storage component.

In accordance with the present invention, there is provided a conveyance system as defined above wherein the conveyance system comprises the removeable particulate storage component In accordance with the present invention, there is provided a beverage machine as defined above wherein the particulate substance is a particulate milk substance.

DESCRIPTION OF THE DRAWINGS

In drawing which illustrate example embodiments of the various aspects of the present invention:

FIG. 1 is a side perspective view of an example of a particulate storage combination or assembly (i.e. cartridge) in accordance with the present invention comprising detachable valved lid element and an example case element;

FIG. 2 is an exploded view of the particulate storage combination shown in FIG. 1;

FIG. 3 is a side perspective view of an example of a particulate delivery component of the present invention;

FIG. 4 is an exploded view of the particulate delivery component shown in FIG. 3;

FIG. 5 is a schematic sectional side view of a combination comprising the particulate storage combination of FIG. 1 associated with the particulate delivery component of FIG. 3;

FIG. 7 is a schematic sectional side view of the view in FIG. 6;

FIG. 8 is a schematic sectional side view of the end of the valve member of a particulate storage combination shown in FIG. 1 in the process of being seated in the funnel of the interconnect member of the particulate delivery component of FIG. 3 which is provided with a valve plug interaction element;

FIG. 9 is a schematic top view of the valve plug interaction element shown in FIG. 8;

FIG. 10 is a schematic sectional side view of the end of the valve member of a particulate storage combination shown in FIG. 1 seated in the funnel of the interconnect member of the particulate delivery component of FIG. 3 with the valve plug interaction element thereof forcing the plug into an open position for the flow of particulate material out of the storage combination;

FIG. 11 is a schematic sectional side view of the end of a further example of a valve member of a particulate storage combination associated with an example valve plug interaction element;

FIG. 12 is a schematic sectional side view of the end of an additional example of a valve member of a particulate storage combination associated with a further example valve plug interaction element;

FIG. 13 is a schematic perspective side view of a housing having a support well for receiving the particulate storage combination of FIG. 1;

FIG. 14 is a schematic side partial sectional view of the particulate storage combination of FIG. 1 in the support well of the housing shown in FIG. 13;

FIG. 15 is a schematic block diagram of an example beverage selection system in accordance with the present invention;

FIG. 16 is a perspective partially exploded side view of an example rotary selection element in accordance with the present invention;

FIG. 17 is a perspective side view of the rotary selection element shown in FIG. 16 with the handle pivoted downwardly;

FIG. 18 is a schematic exploded perspective side view of the rotary selection element shown in FIG. 16 in the process of being installed in a coffee maker housing adjacent the switch configuration elements and associated with a dispenser station sleeve for the outlet ends of fluid conduits from other stations;

FIG. 19 is an enlarged partially cutaway perspective view showing the rotary selection element in place beneath the infrared emitter/detector members (not shown);

FIG. 28 is a partial sectional side view of a portion of the machine of FIG. 26 showing an example water and milk powder mixing station which may include a mixing chamber, the mixing station being in fluid connection to the dispensing station via a milk foamer member.

For each of the figures the same reference numerals or indica are used to designate the same parts.

Turning to FIGS. 1 and 2, these figures illustrate an example embodiment of a [removable or] detachable valved lid element for a particulate storage combination or assembly 1 (i.e., cartridge) in accordance with the present invention; an example case element 3 is also shown. FIG. 1 shows the a particulate storage assembly 1 in assembled format whereas FIG. 2 is an exploded view of the particulate storage assembly 1 exposing various parts of the particulate storage assembly, in particular of the lid element 5 and the opening 7 of the case element 3.

Figure 6:
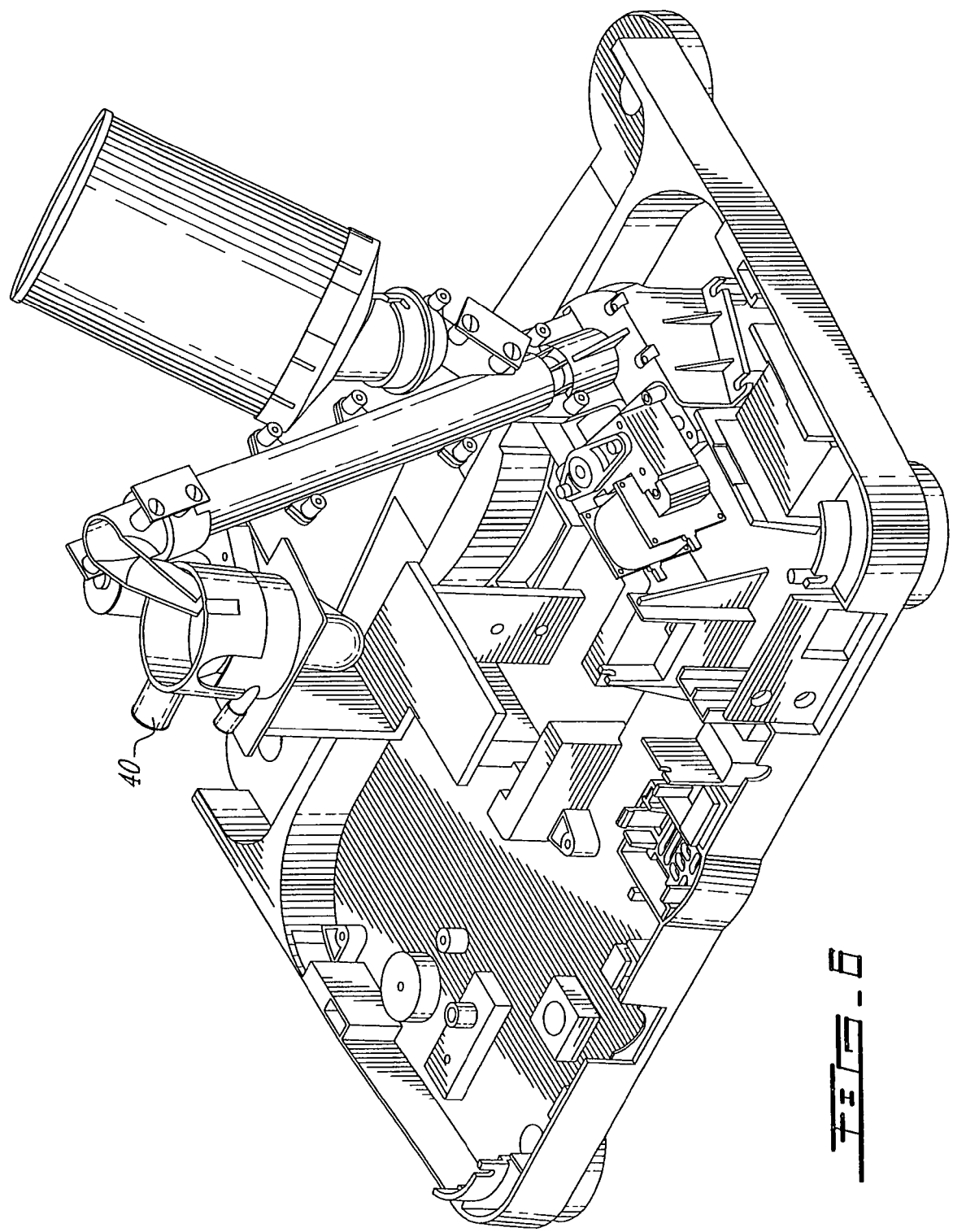
FIG. 6 is a schematic perspective side view of the combination of FIG. 5 shown associated with a milk preparation station for the delivery of powdered milk to the station for mixing with hot water.

The case element 3 as shown has a rigid wall structure surrounding the opening 7. The case element 3 and the lid element 5 may be configured in any suitable manner such that the lid element 5 is removably attached(able) to the case element 3 so as to cover the opening 7 and thus form an enclosed space (e.g., chamber) for containing a particulate substance (not shown); the particulate substance may for example be a particulate milk substance such as for example powdered milk. For the example embodiment shown the removable attachment is accomplished by configuring the lid element 5 and peripheral wall surrounding the opening 7 for a manually detachable press-fit (i.e., the case element and the lid element may be attached and detached by hand). In other words, the lid element 5 is provided with a peripheral ring band 9 which has an inner diameter slightly smaller than the outer diameter of the peripheral wall surrounding the opening 7 of the case element 3. These diameters are selected relative to each other such that the lid element 5 may be manually pressed into (friction) engagement with the peripheral wall surrounding the opening 7 of the case element, 3 (i.e., so as to close off the opening 7). In the embodiment shown the peripheral ring band 9 is provided with a plurality of spaced apart slots or cuts (one of which designated by the reference numeral 11). These slots facilitate a predetermined degree of expansion of the peripheral ring band 9 when the ring band 9 is forced to (frictionally) engage the peripheral wall surrounding the opening 7 of the case element 3.

As an alternative the lid element may be a screw-on lid element. In this case the inner surface of the ring band may be provided with screw-like threads for mating engagement of corresponding screw-like threads on the outer surface of the peripheral wall surrounding the opening of the case element.

In event any, any other type of attachment mechanism may be used to attach the lid element to the case element keeping in mind that the lid element must close of the opening and is to be detachably fixed to the case element.

The particulate storage assembly may, for example, be used to contain a particulate substance for the preparation of a beverage (e.g., such as a coffee beverage); the particulate substance may be soluble or dispersable in water; it may, for example, be a powdered instant coffee material, a powdered instant milk or milk like material, powdered coco, or the like.

In accordance with the present invention the entire particulate storage assembly may be reused or alternatively only the lid element 5 may be reused. In the first case, once the particulate substance in the case element 3 is exhausted the lid element 5 may be removed from the case element 3, the case element 3 may be refilled with particulate substance and the lid element 5 placed back on the case element 3. Alternatively, the lid element 5 may be removed from the empty case element 3 and then be attached to a fresh case element 3 having particulate substance therein. In the latter case a plurality of such fresh case elements may be stored for sequential use; each stored case element may be associated with any type of removable lid for closing of the opening during storage; the lid may be for example any type of (known) (e.g., flexible) manually (i.e., by hand) pull or rip off lid.

Returning to FIG. 2 the lid element has a wall member 13 extending from the peripheral ring band 9 and is provided with a valve member 15. The valve member illustrated has the form of a valved spout member; however the valve member may take on any other desired or necessary form keeping in mind its purpose as described herein. The valved spout member extends from the wall member 13 in an off-center like fashion. The valve member 14 has a hollow open ended cylindrical extension 17 which defines a channel 19 for providing a flow path for the flow of particulate substance or material out of the enclosed space as defined by the lid element 5 attached to the case element 3. One open end of the cylindrical extension 17 is attached to the wall member 13 and the other distal open end thereof is closed off by a removable cap 21. The cap 21 as illustrated is attached to the end of the cylindrical extension by a pin/slot combination; the pin 23 being attached to the cylindrical extension 17, the L-shaped slot 25 being defined by the peripheral wall of the cap 21; the long part (or root part) of the slot at one has an opening at the periphery of the cap whereas the shorter part (or foot part) extends perpendicularly from the longer part at the other end of the long part of the slot. Although only one such pin/slot combination is shown two or more may be used. Attachment is accomplished by passing the pin 23 through the root part of the L-shaped slot 25 and then turning the cap so as to lodge the pin in the foot of the L-shaped slot. Any other suitable (known) type of attachment may of course be used (e.g., screw type attachment). If desired, the cap may be more or less permanently fixed to the cylindrical extension as by an adhesive or glue.

The cap 21 has a blockable opening or outflow aperture 27 (see FIG. 2) for providing an outlet for the flow of particulate substance or material out of the channel as defined by the cylindrical extension 17. The outflow aperture 27 is blockable by a spring biased plug element 29. The plug element 29 as shown in FIG. 1 is biased in a closed position so as to block off the outflow aperture 27. The plug element 29 is biased by a bias component which comprises a coil spring element 31 and a spring support element 33. The spring support element has a circular perforated base plate member 35 from which extends a stubby spring support projection 37; the perforations of the base plate member are sized and configured so as to allow the flow of particulate substance therethrough. The inner surface of the cylindrical extension 17 is provided with an inwardly extending ridge member (hidden from view) which may take the form of an annular like ring for seating or engaging the periphery of the circular perforated base plate member 35. The coiled spring element 31 is disposed about the stubby support projection 37 such that one end thereof abuts the base plate member 35 and the other end is engaged in a cavity in the base of the plug element 29 (see FIG. 5). The plug element 29, spring element 31, and stubby projection 37 are disposed such that the plug element 29 may be urged to compress the spring element 31 (again see FIG. 5). In other words, the plug element 29 and the bias component are configured such that the plug element 29 is displacable between a closed position and an open position. When the plug element is in the closed position (as shown in FIG. 1) the plug-element 29 closes off the outflow aperture 27 whereby particulate material (e.g., powder) is unable to flow out of said enclosed space (e.g., chamber) through said outflow aperture 27. On the other hand, when the plug element 29 is pushed or urged to compress the spring element 31, the plug element 29 is able to pass from the closed position to an open position such that when the plug element is in said open position particulate material (e.g., powder) is able to flow out of said enclosed space (e.g., chamber) through said outflow aperture (see FIG. 10).

The example embodiment of the lid element shown in FIGS. 1 and 2 is also provided with a guide projection or tab 39 which may be used to orient the storage assembly with respect to components of a particulate conveying assembly as shown in FIGS. 5, 6, 7, and 13 and as shall be described below.

Turning to FIGS. 3 to 7 these figures illustrate an example embodiment of a conveyance system or assembly for conveying (or dispensing) particulate substance or material from a removeable storage combination such as described herein (e.g., for conveyance to a predetermined location or station such as a mixing station 40 (see for example FIGS. 6 and 7)). The assembly for conveying (or dispensing) particulate substance comprises a particulate delivery component 41 which comprises a conveyor element 43, and an interconnect element 45; if desired or necessary the assembly for conveying (or dispensing) particulate substance may also include a valve plug interaction element (as shown in FIGS. 8, 9 and 10).

Turning to FIG. 4, this figure illustrates in exploded view a conveyor element 43 for conveying particulate substance from a replaceable particulate storage component to a chute 47. This figures also illustrates the interconnect element 45 for releasably interconnecting the conveyor element 43 and the outflow aperture of a replaceable particulate storage component (such as for example described herein) for the flow of particulate substance through the outflow aperture thereof to the conveyor element 43.

The illustrated conveyor element 43, as may be seen, takes the form of an Archimedes screw type conveyor and thus has a broad-threaded screw member 49 encased in a hollow open-ended cylinder member (one half of which is designated by the reference numeral 51). The lower end of the screw member 49 is mechanically coupled by a gearing mechanism (not shown) to an electric motor-53 such that when the motor 53 is electrically energized rotation of the motor 53 induces a corresponding rotation of the screw member 49 in a rotational direction for urging particulate material to flow upwardly towards the distal end 55 of the conveyor element; the motor may be mechanically coupled to the screw member in any suitable (known) manner. The distal end 55 of the conveyor element is provided with the particulate chute member 47 for directing the particulate substance to a desired location or station.

The distal end of the conveyor element may also as desired include a particulate sensing component (indicated generally at 57) for sensing the absence of particulate material at the distal end of the conveyor element. The particulate sensing component may be configured in any suitable manner so as to generate a signal indicative of absence of particulate material. Such signal may for example be directed (not shown) to a solenoid switch component which may be configured to energize the motor in response to the presence of such signal (i.e., provide electrical current to the motor) so as to induce particulate material to flow up the conveyor element to the distal end; alternatively the signal may be directed to a controller element such as for example an electronic computer element comprising a suitable configured microprocessor On the other hand, the other lower end may alternatively or additionally, if so desired, be provided with a similar particulate sensing component (indicated generally at 59). This lower particulate sensing component may be used to generate a signal indicative that the storage component is empty of particulate substance and/or block energization of the motor 53 and illuminate a signal light indicative that the storage component needs to be replaced The interconnect element 45 is also disposed at the lower end of the conveyor element. The interconnect element 45 has a hollow cone member 61 and a tube member 63 which extends from the apex thereof. The tube member 63 communicates with the interior of the lower end of the hollow open-ended cylinder member of the conveyor element (i.e. the interconnect element) having the general form of a funnel member (see FIG. 5). For the purposes of the illustrated example particulate delivery component the hollow cone member 61 is configured to matingly engage the correspondingly shaped cap of the spout valve of the storage combination shown in FIGS. 5 and 7.

Turning to FIGS. 8, 9 and 10, these figures schematically illustrate an example embodiment of a valve plug interaction element 65 for releasably maintaining (i.e., for urging) the plug element 29 in an open position (i.e., against the bias component). As may be seen, the valve plug interaction element is disposed in the hollow cone member 61 of the interconnect element. The valve plug interaction element 65 has a circular perforated base plate member 67 from which extends a plug engagement projection 69; the perforations 71 of the base plate member 67 are sized and configured so as to allow the flow of particulate substance therethrough. The base plate member 67 may be integral with (e.g., be glued to) the hollow cone member 61 or it may removeably engage the inner side wall surface of the hollow cone member 61. As may be understood from FIG. 10, the plug engagement projection 69 may be used to act against the plug 29 so as to induce compression of the associated coil bias spring and place the plug 29 in an open position as described herein (i.e., for the free flow of particulate substance in the direction of the show arrows).

The valve plug interaction element 65a as shown in the may alternatively be connected directly to or be integral with the plug 29 itself as shown in FIG. 11 (i.e., the valve plug interaction element may be part of the lid element shown in FIG. 11).

If desired the valve plug interaction element may only comprise the circular perforated base plate member. In this case, however, the plug 29 of the storage combination may include a plug extension member 29a which may serve the same function of the plug engagement projection (i.e., the circular perforated base plate member may have a member for engaging the plug extension) (see FIG. 12) so that it in turn induces the plug to compress the coil bias spring.

A conveyance assembly for conveying (or dispensing) particulate substance in accordance with the present invention may further comprise a support component.

Turning to FIGS. 13 and 14 these figures illustrate an example of a support component configured for releasably engaging a removeable storage assembly or component as described herein such that the storage component 1 is oriented (during removal of particulate substance therefrom) so that the valved wall member 13 at least partially forms the bottom of the so engaged storage component 1 (i.e., for the free flow (i.e., gravity induced flow) of particulate substance from the enclosed space). As may be seen the support component 1 comprises a cartridge well for receiving the storage assembly, lid element head first. The cartridge well has a wall member 71 and a base member 73 (see FIG. 14). In the embodiment shown the base member 73 is disposed at an angle to the horizontal such that it may engage the lid element 5 so that the lid element 5 is also disposed at similar angle (i.e., the lid element thus forming part of the bottom of the storage assembly). As seen the valve member 15 extend through an opening in the base member 73 Alternatively the base member 73 may be disposed so that it is essentially horizontal and engages the lid element so that the lid element is also disposed essentially horizontally (i.e. the lid element essentially becomes the bottom of the storage component during use). The illustrated cartridge well has a guide slot 75 for sliding and matingly engaging the previously mentioned guide projection or tab 39 for assuring proper orientation of the spout valve with respect to the interconnect element as the storage combination or component is placed into the cartridge well.

As mentioned above, in a further aspect the present invention relates to a mechanism for selecting or choosing a particular beverage from amongst a group of beverages which a beverage machine is able to dispense. Thus in accordance with the present invention a beverage selection system (or assembly) for an automatic beverage machine for dispensing a beverage selectable from a plurality of beverage types (or varieties) may comprising a configuration controller component, a plurality of switch elements, and a switch selection element.

Turning to FIG. 15, this figure schematically illustrate an example embodiment of a beverage selection system in accordance with the present invention. The system shown has a switch selection element indicated generally at 79 which comprises an infrared reflection member 81 disposed on an elongated support member 83. The system also has four switch configuration elements 85, 87, 89, and disposed on a second support member 93 above the selection element 79. The reflection member 81 may for example, be of a mirror like material whereas the support member depending on the form which the support member takes may be of a suitable infrared non-reflective material. For example if the support member has the elongated form shown in FIG. 15 for a push-pull type displacement (as described below) wherein a portion of the surface of the support member 83 uncovered by a reflection member may alone be disposed so as to be exposed opposite a switch configuration element, the support member 83 in such area may be of a non-reflective material; on the other hand, if the reflection member is disposed on a projection which extends radially outward from a rotary type support member (as discussed below) it may be of any suitable material since the system may be configured such that only the reflection member will be disposed opposite a switch configuration element and not a support member surface alone.

Each of the switch configuration elements 85, 87, 89, and 91 comprises an infrared detection component comprising an infrared emitter means 93 for providing infrared for reflection from said infrared reflection member 81 as reflected infrared, and an infrared detector means 95 for detecting said reflected infrared from said infrared reflection member. The switch elements may comprise any suitable (known) emitters and detectors.

Each of said switch elements is configured to pass from a first state to a second state in response to detection of said reflected infrared and to pass from said second state to said first state in response to the non-detection of said infrared reflected infrared (i.e., the second state is maintained for the duration of the detected reflected light). In a simple form a switch configuration element may be able to pass from a first voltage state to a second voltage state. On the other hand, the switch configuration elements may include a signal generator component (as shown) which is able to generate a more complex configuration signal (i.e., electrical signal) in response to the detection of reflected infrared (i.e., second state); no such complex configuration signal being generated when the switch element is in the first state. The switch configuration elements may in any event take on any suitable (known) form provided that they function as described above (i.e. provide detectable first and second states).

Each switching configuration element is connected to the configuration controller component 97. The configuration controller component 97 may, for example, comprise an electronic computer element (e.g., comprising a microprocessor), appropriate software (i.e., programming instructions), interconnections between the computer element and the beverage preparation elements, etc. The configuration controller component 97 is in any event set up so as to be able (i.e., configured) to recognize (i.e., detect) when a switch element is in said second state (e.g., by the presence of a configuration signal, the surpassing of a threshold voltage, etc.) and so as to be able to initiate the configuration of the beverage machine for (i.e., uniquely) dispensing the beverage type associated with such switch element. The configuration controller component may for example comprise a microprocessor which compares values corresponding to the second state with values stored in a table of values and then determines an appropriate output reaction for configuring the beverage machine for the preparation of a specific beverage.

Referring to FIG. 15, the configuration controller component 97 is shown by way of example as being able to selectively initialize the appropriate beverage preparation elements of the beverage machine for the preparation of four beverage types; each of the blocks notionally groups together those beverage preparation elements appropriate for the preparation of a specific beverage. For example, switch configuration element 87 is shown as being in the second state due to reflected infrared (see arrows); this second state may be recognizable by the configuration controller component 97 as designating a choice for cappuccino and thus the configuration controller component 97 would set itself up to initiate a beverage preparation cycle using the necessary elements of the coffee machine for the preparation of cappuccino; the preparation cycle commencing once a start brew button (not shown) connected to the configuration controller component 97 signals the configuration controller component 97 to make available to the necessary preparation elements the necessary operation energy (e.g., electricity), from an energy source (not shown), in accordance with the chosen beverage preparation cycle. Although four beverage preparation elements are shown by way of illustration purposes additional (or even less) such elements may of course be used with the requisite number of switch configuration elements.

The beverage preparation elements may for example be selected for among the following non-limiting list of elements:

a particulate material storage means (e.g., for a beverage (e.g., coffee, tea, cocoa, etc.), and a beverage additive such as a milk substance, sugar etc.); the storage means may for example be a particulate storage assembly such as described herein;

a particulate material delivery means (e.g., such as described herein) for delivering particulate material from the storage means to a brew vessel, pressure brewing chamber (such as is described in WO00/64318), dispensing station etc. as the case may be;

an aqueous medium delivery means for delivering aqueous medium to a brew vessel, pressure brewing chamber; mixing station, etc.;

a beverage withdrawal means for withdrawing or delivering beverage from a brew vessel or pressure brew chamber to a beverage dispensing station (e.g., by a pumping element, by a gravity tube or pipe, etc.);

control means (e.g., computer) for controlling an automatic brewing cycle which includes for example, the delivery of aqueous medium (e.g., hot water) to a brewing station or beverage additive mixing station (e.g., to hydrate powdered milk, etc.) As well as delivery of beverage to a dispensing station.

The above list of element is meant to be illustrative only; other types of (known) beverage preparation elements may be added or used in the alternative.

Referring back to FIG. 15, the infrared reflection member 81 is disposed on the elongated support member 83 which is displaceable in a push-pull type manner in the direction of the arrows 101 and 103 whereas the infrared detection components are fixed relative to the reflection member 81 (i.e., the reflection member is induced to move rather than the infrared detection components). On the other hand, if desired or necessary the infrared detection components may be displaceable and the reflection member may be fixed. As a further alternative, both the reflection member and the infrared detection components may be displaceable. In any event, such displacement is to be carried out keeping in mind the purpose of the selection system, namely, to result in the ability to selectively configure a beverage machine for the preparation of a desired beverage type from among a class or group of beverage types.

Returning again to FIG. 15, the switch selection element 79 also includes an elongated hollow sleeve member 105. The elongated support member and reflection member are disposed in the elongated hollow sleeve member for sliding displacement thereof in the sleeve member. The upper wall of the hollow sleeve member is provided, at predetermined locations, with exposure openings 107, 109, 111, and 113. These exposure openings are each disposed opposite a respective switch element so as to provide an exposure window for exposing the reflection member 81 opposite the respective switch element (i.e., to allow infrared from the switch element to be reflected back thereto for detection). Each of the exposure windows is associated with a respective releasable locking mechanism for releasably locking the support member in position so that the reflection member is in the exposure window. In other words the switch selection element and the switch configuration elements are configured and disposed so that the light reflection member is displaceable between releasably lockable positions such that each such lockable position associates the light reflection member with the light detection component of a respective switch element.

The illustrated example releasable locking mechanism comprises a cavity element 115 associated with the hollow sleeve member 105. A portion of a ball bearing 117 is able to extend out of a cavity opening communicating with the interior of the hollow sleeve from below an associated upper window opening; the cavity opening is smaller than the ball bearing 117 such that the ball bearing may not pass therethrough into the hollow sleeve member. The cavity element includes a coiled bias spring 119 which at one end pushes on the ball bearing and at the other end engages the bottom of the cavity. A sufficient force pushing down on the ball bearing will compress the coil spring allowing the ball bearing to be pushed into the cavity clear of the cavity opening. As part of the releasable locking mechanism, the elongated support member has an indentation or cavity 121 for matingly engaging the portion of the ball bearing 117 extending out of the cavity opening so as to releasably lock the elongated support member in place. However the cavity of the elongated support member is configured such that the application of sufficient predetermined force in the direction of one of the arrows 101 and 103 will cause the peripheral edge of the cavity of the elongated support member to slide over the ball bearing to urge the ball bearing into the associated cavity element compressing the bias coil spring so as to allow the elongated support member to slide on to the next releasable locking mechanism.

As an alternative to the push-pull type selection element, a rotary selection element such as shown in FIGS. 16 to 21 may be used instead. As may be seen, the rotary selection element 121 comprises an annular or ring shaped support member 123 for support of the reflection member 125. The reflection member 125 is disposed on a finger-like projection 127 which extends radially outward from an upper part of the ring-like support member 123. The ring shaped support member 123 is associated with an annular groove element 129. The bottom of the groove element is defined by the outer surface 131 of the ring shaped support member 123. On the other hand, the groove element is also defined by opposed side walls defined on the one hand by a lower ring projection 133 extending radially outward from the bottom part of the ring-like support member and a plurality of radially spaced apart and extending projections (designated 135) disposed intermediate or between the finger-like projection 127 and the above mentioned lower ring projection 133. The opposed side walls are spaced apart so as to be able to slidingly engage the curved or arched side edge of a projection member defined by a housing support as shall be described below (see FIGS. 18 and 19); the so engaged rotary member is able to rotate about the central longitudinal axis of the ring shaped support member form one releasably lockable position to another.

Turning back to FIGS. 16 and 17, the rotary selection element also has a handle member 141 which is pivotably displaceable between a position more or less in the plane of the ring shaped support member (see FIG. 19) and a position which is at an angle to the plane of the ring shaped support member (see FIG. 17). The handle member has projection members 143 and 145 configured for a friction fit with side grooves 147 and 148 of the lower ring projection as well as elements 149 and 151 for sleeve or collar engagement of pivot pin projections (one of which designated by the reference number 153 in FIG. 16) extending from both sides of the central finger member disposed between the grooves.

Turning to FIG. 19, the rotary selection element 121 is shown in place with the opposed side walls of the groove element slidingly engaging the curved or arched side edge of the projection member 155. The rotary selection element is secured in place by a clamp element 157 (see FIG. 18) having two screw openings for receiving screws 159 for screw engagement with respective screw attachment openings defined by the housing support (one of which is designated by the reference numeral 161). The inner surface of the clamp element 157 may be configured to slidingly engage the extending projections 135. The outer surface of the clamp 157 may be provided with symbols (not shown) indicative of a beverage type, the symbols being disposed so as to be associated with a releasable locking position of the rotary selection element; the handle having a pointer projection 163 pointing to a symbol when the rotary selection element is in a locking position.

The so disposed rotary selection element is displaceable about a horizontally extending axis 165 (see FIG. 19) of rotation co-incident with the longitudinal axis of the ring shaped support member 123 between a plurality of releasably lockable rotary positions, each such lockable rotary position being associated with a respective switch element Thus the reflection member 125 may be made travel through a curved or arched trajectory.

Figure 22:
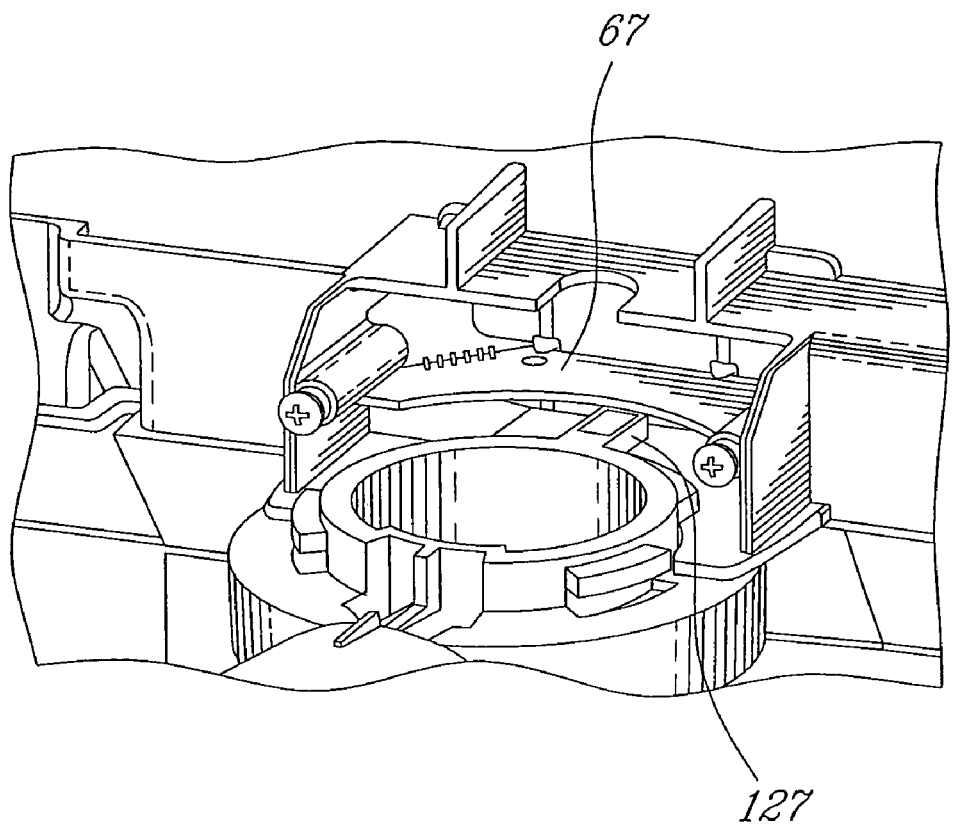
FIG. 22 is an enlarged partially cutaway perspective view similar to FIG. 19 showing the rotary selection element in place beneath the infrared emitter/detector members but with some electrical components being shown.
Figure 23:
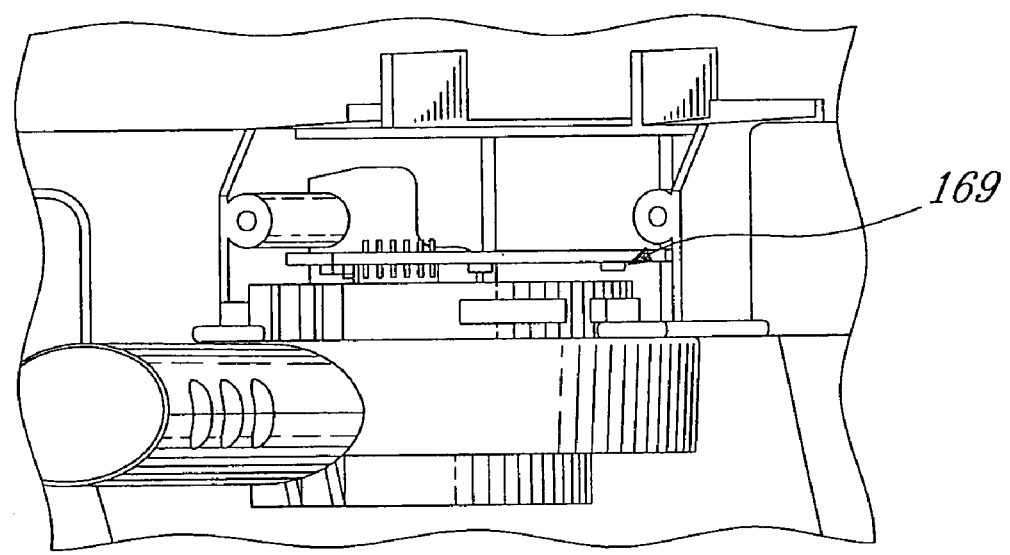
FIG. 23 is a front enlarged partially cutaway perspective view showing the rotary selection element (as seen in FIG. 22) in place beneath the infrared emitter/detector members.

As seen from FIGS. 22 and 23, the housing support also supports an electronic selection board 167 on the underside of which is disposed four infrared emitter/detector combinations for four respective switch configuration elements (one of which is designated by the reference number 169 in FIG. 23). The infrared emitter/detector combinations are disposed about a curve or a arched pathway located just above the arched trajectory of the reflection member. Thus, as for the push-pull selection system described above, each configuration switch element of the rotary selection system comprises a light detection component comprising a light emitter means for providing a light pulse, a light detector means for detecting reflected light and a signal generation means for generating an activation electrical signal in response to detected reflected light whereby a switch element passes to and is maintained in said active configuration for the duration that reflected light is detected; the light may for example be infrared light.

The electronic selection board also includes elements of the configuration controller component.

Figure 20:
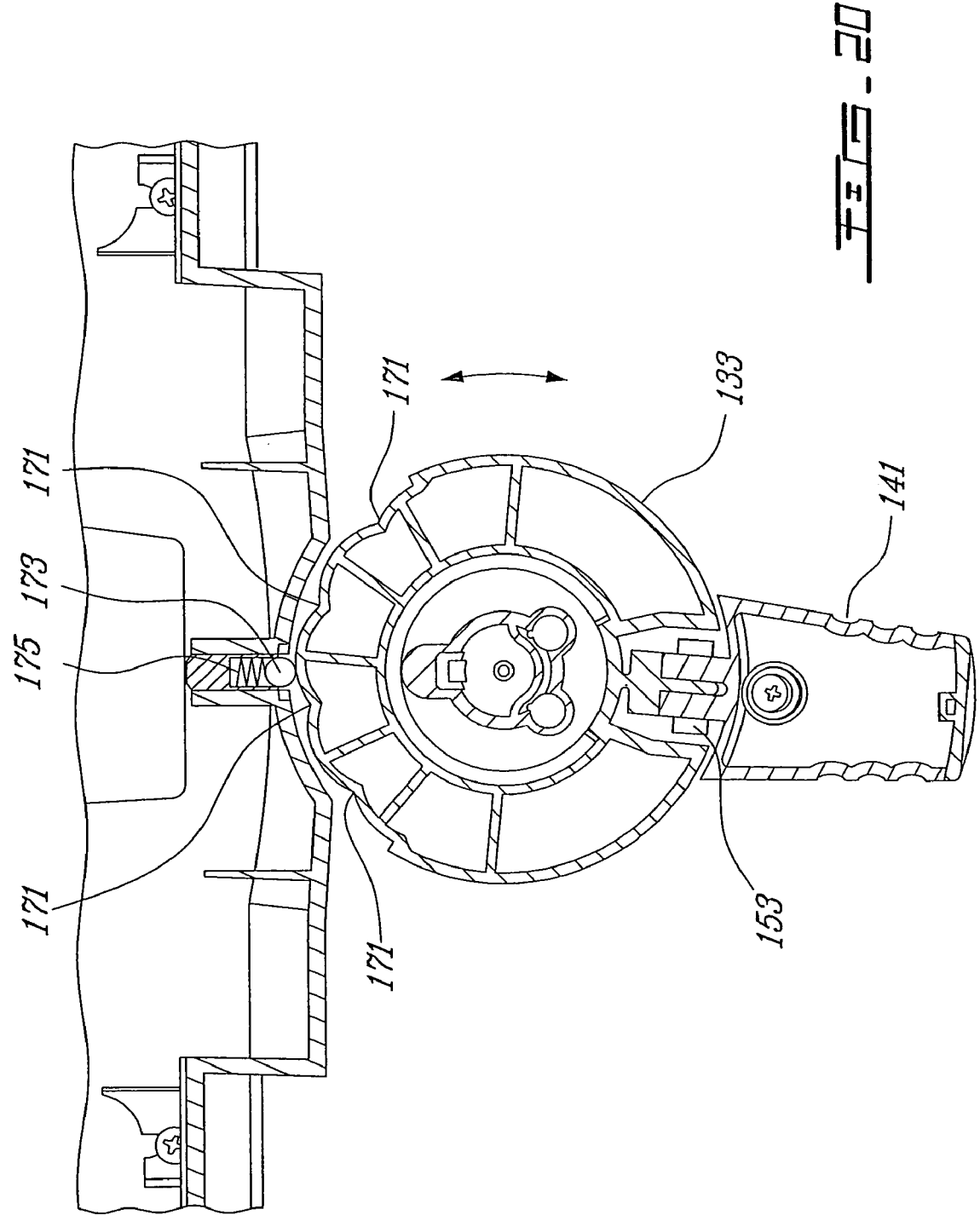
FIG. 20 is a schematic sectional view of the rotary selection element shown in FIG. 19 with the rotary selection element being in the process passing from one lockable position to the neighboring locking position.
Figure 21:
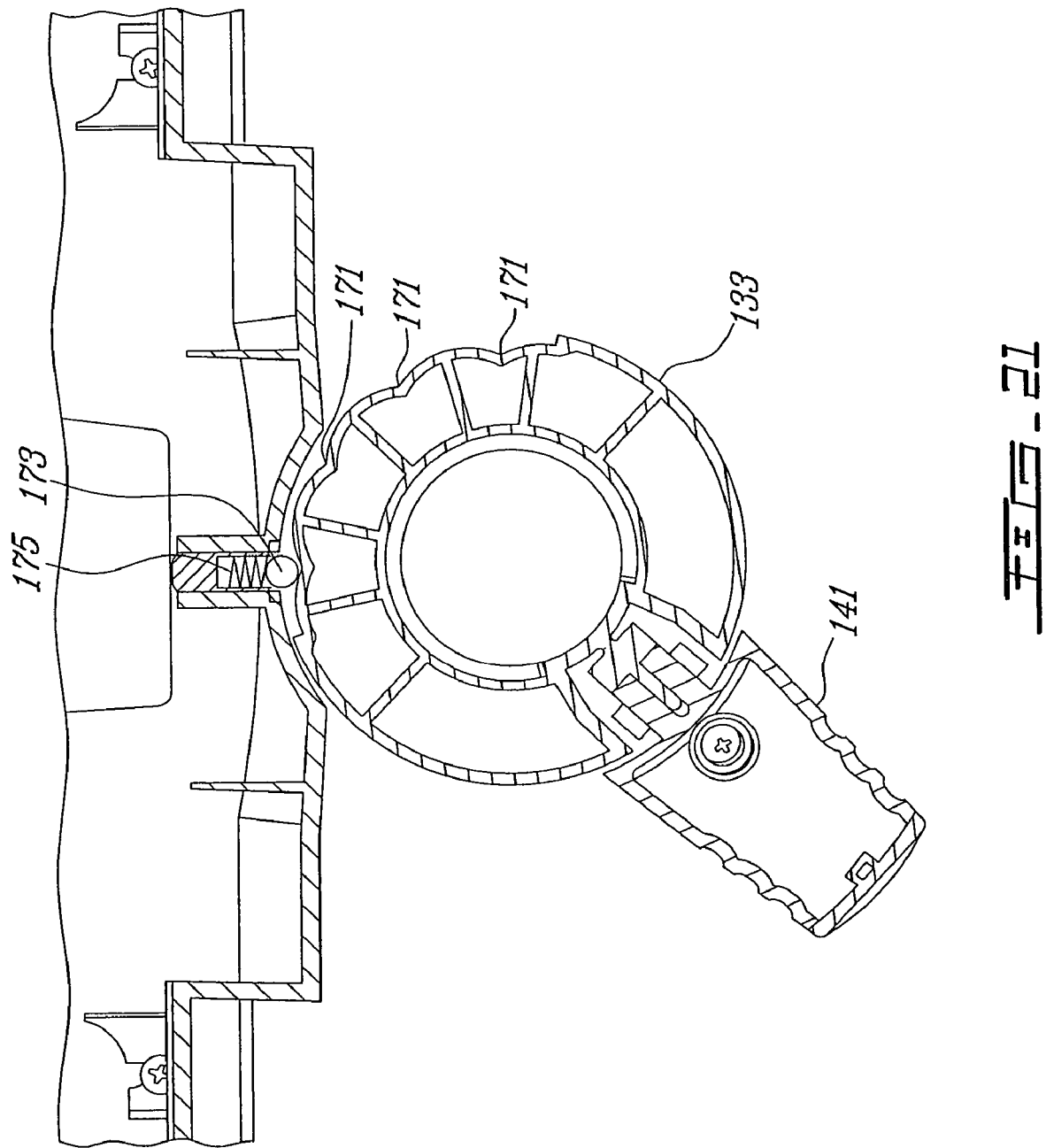
FIG. 21 is a schematic sectional view of the rotary selection element shown in FIG. 20 with the rotary selection element being in the neighboring locking position.

Turning to back FIGS. 20 and 21, the rotary selection element may also be releasably locked into discrete positions whereby the reflection member thereof is associated with the light (e.g., infrared) detection component of a respective switch element. The locking system for the rotary selection element is analogous to the releasable locking mechanism shown in FIG. 15, for the push-pull type selector. Thus, the lower ring projection 133 extending radially outward from the bottom part of the ring-like support member 123 has a rear surface which is contoured so as to have a plurality of intersecting curved surfaces (e.g., camming-like surfaces). The curved surfaces intersect so as to define features which are slot like (one of which is designated by the reference number 171). The releasable locking mechanism also a cavity associated with a pin member 173 which is biased by a spring member 175 in the cavity to be in an extended position. The pin member 173, when in the extended position (as shown in FIG. 21), is disposed such that an engagement end thereof may be seated in a slot-like feature 171. The pin member 173, when so seated in the slot-like feature 171, releasably locks the rotary selection element in a discrete position. The engagement end of the pin member has an engagement surface suitably shaped such that manual rotation of the rotary selector element will cause the pin member 173 to ride up and over the curved surface in the direction of travel (see FIG. 20); this action will push the pin member 173 into the associated cavity allowing the reflection member 125 to be carried to another discrete position. When locked in a discrete position, the reflection member 125 is disposed opposite a predetermined configuration switch element 169 (FIG. 23), the switch element in turn being associated by the configuration controller component, to which it is connected, with beverage machine configuration for the preparation of a specific beverage. Thus, in a manner analogous to that described herein with respect to the push-pull selection system of FIG. 15, the illustrated rotary selection system is set up such that the light reflection member 125 thereof is displaceable about a horizontally extending axis of rotation 153 (i.e,. for travel of the reflection member 125 over a curved band or trajectory) relative to the light (infrared) detection components between a plurality of releasably lockable (rotary) positions, each such lockable (rotary) position being associated with a respective switch element.

Figure 24:
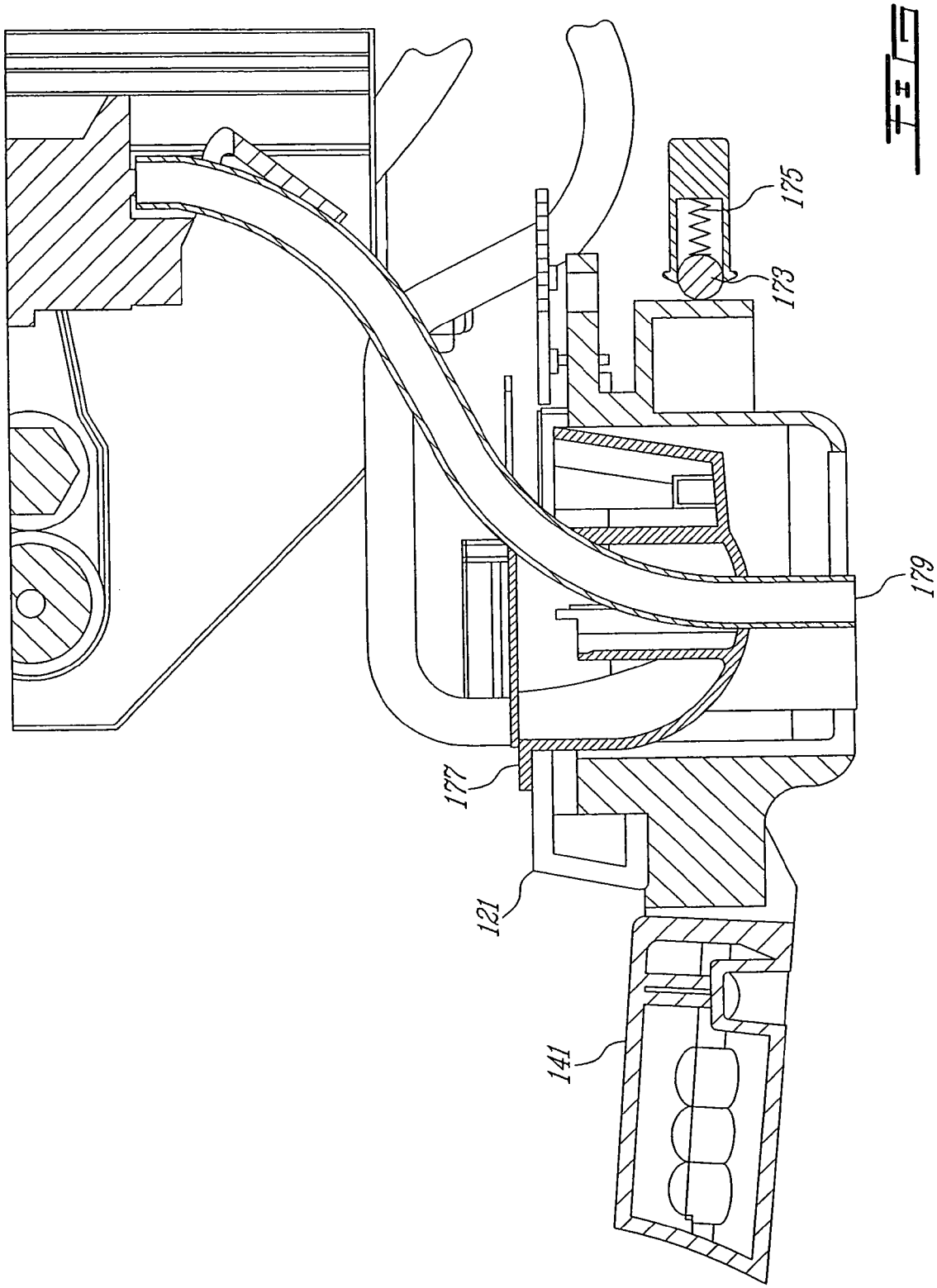
FIG. 24 is a schematic sectional view of the rotary selection element of FIG. 18 disposed adjacent the dispensing station with the outlets of the fluid conduits extending from a dispenser station sleeve (i.e. conduits from the coffee extraction station, hot water component, milk preparation station, etc.)

As shown in FIG. 24, the rotary selection element may be disposed adjacent the dispensing station with the outlets of the fluid conduits extending from a dispenser station sleeve 177 (i.e., from the coffee extraction station, hot water component, milk preparation station, etc.) disposed in the annular opening defined by the rotary selection element. The outlet for the coffee is shown as element 179.

The beverage machine may also be provided with a separate starting contact for (electrical) energization of the beverage machine, the starting contact being suitably connected to a power source. The starting contact may comprise a push button switch element for this purpose. Thus when the beverage machine is configured for the preparation of a particular beverage by the rotary selection element, the push button may be pushed in so as to triggers or initiates the preparation cycle of the beverage variety selected.

Figure 25:
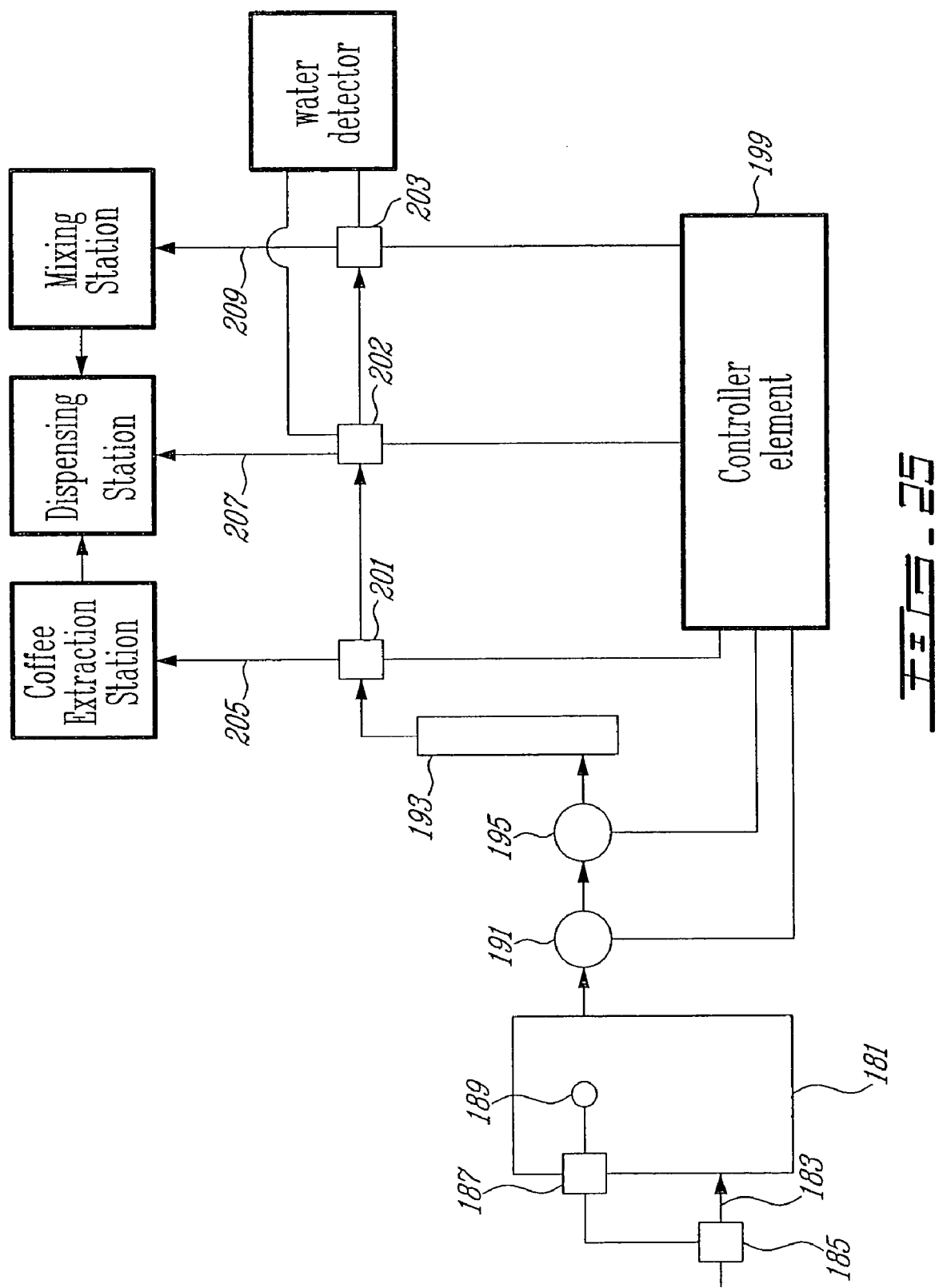
FIG. 25 is a schematic block diagram of an example hot water dispensing system in accordance with the present invention.

Referring to FIG. 25, this figure schematically illustrates an example of a hot water dispenser assembly (or system) in accordance with the present invention which may for example be associated or incorporated into a coffee beverage making machine. The hot water dispenser system comprises an example valve assembly, a hot water component for producing hot water, and a fluid conduit component providing fluid communication between the hot water component and the valve assembly.

Thus, the illustrated hot water dispenser system has a water holding tank or reservoir 181 which may be filled manually through an opening in the top of the tank. The tank 181 may also be filled via a water line or pipe 183 connected to a suitable source of water (e.g., municipal water system). The water pipe 183 is connected to the municipal water line via a solenoid valve element 185. The solenoid valve element 185 is able to pass between an energized and non-energized state; in the energized state an electrical current is applied to the solenoid valve whereas in the non-energized state no current is so applied. When the solenoid valve element 185 is in the non-energized state it closes off water communication to the tank 181; when the solenoid valve element 185 is in the energized state it opens water communication to the tank 181. The solenoid valve 181 is controlled by a float switch mechanism 187 associated with the tank. The float switch mechanism 187 may be any (known) type of float switch mechanism which is configured to energize or de-energize the solenoid valve in response to the rise and fall of a float 189 in the tank, e.g. the solenoid 185 being energized when the float passes below a predetermined height level in the tank.

The hot water system shown includes a pump 191 for the displacement of water from the holding tank 181 to an (electrical) hot water heater 193 through a flow meter element 195. The flow meter 195 is configured in any suitable (known) fashion to generate a (electric) signal indicative of the amount of water being sent to the water heater, the signal being sent to an electronic controller element 199 which is configured in any suitable manner to selectively choose, initiate as well as stop a predetermined hot water dispensing cycle (i.e., control pump activity).

The illustrated hot water dispensing system shown in FIG. 25 has a multi-way valve assembly comprising three selectively operable solenoid valves, 201, 203 and 205, the valves being selectively operable by the electronic controller element 199. The first two valves 201 and 203 each have a single inlet port, but two outlet ports. One outlet port is for communication with the next upstream valve and the other for communication with the associated station (see below). The active outlet port (i.e., open port) is dependent on the energization state of the valve. The third valve 203 has an inlet port and a single outlet port. Thus, as shown, the valves are connected in series to each other. Each solenoid valve is configure and disposed so as to control the flow of hot water from the hot water heater through a respective conduit branch 205, 207 and 209 to one of three predetermined stations, namely a brewing station, discharge station, and a mixing station. The brewing station and a mixing station are in fluid communication with the discharge station (see, for example, FIG. 24).

A brewing station may take on any suitable (known) form and may, for example, include a coffee extraction device comprising an extraction chamber in which may be disposed (e.g., manually) a coffee tablet and configured to be fed with heated water from the heater, and from which, following an extraction operation, brewed coffee flows to the dispensing station into a receptacle. For examples of such devices please see PCT international publication nos. WO 00/44268, WO 00/38558 and WO 00/64318.

Figure 26:
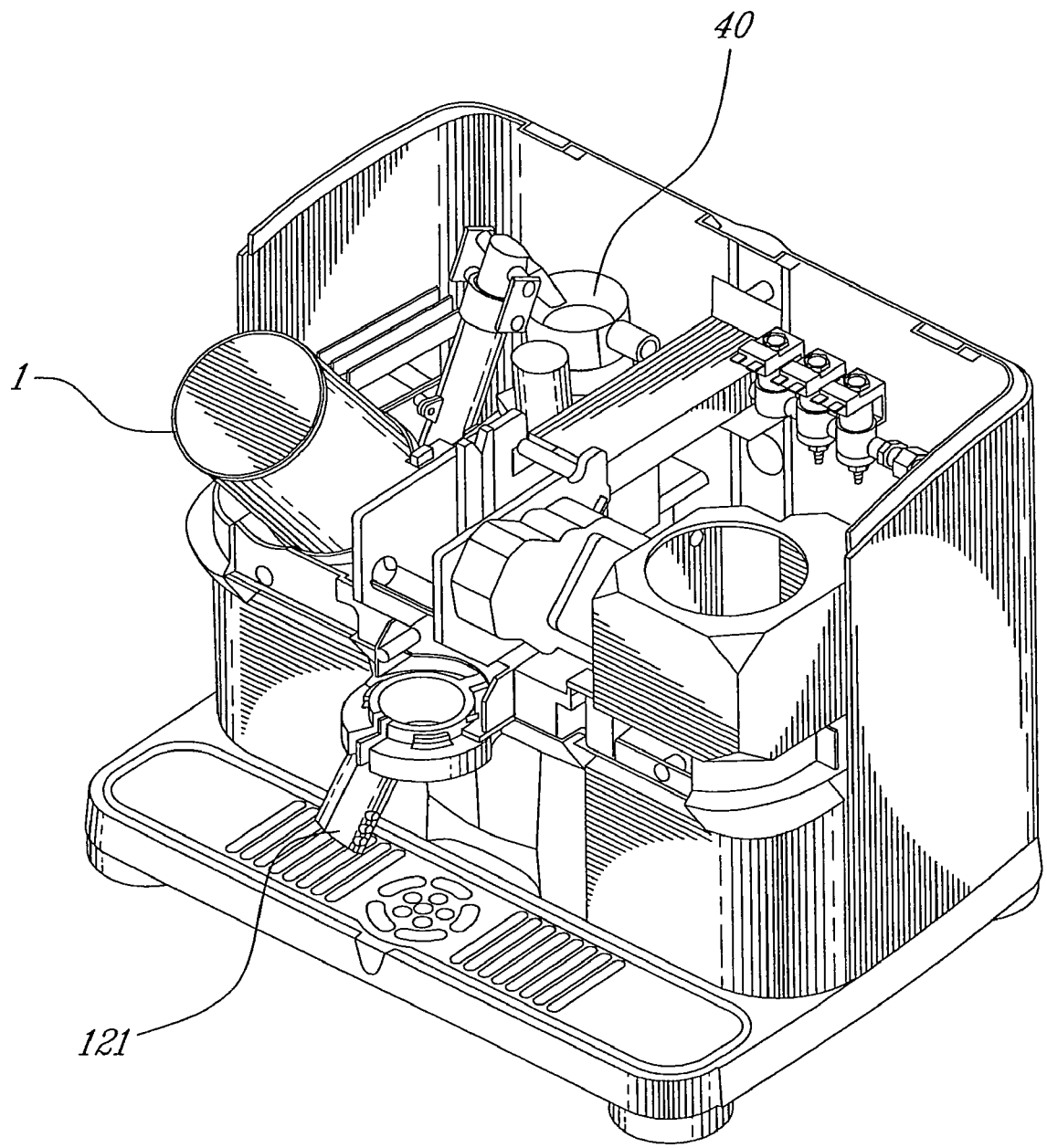
FIG. 26 is a schematic perspective front side view of a coffee machine incorporating various elements of the present invention (outer housing partially removed)
Figure 27:
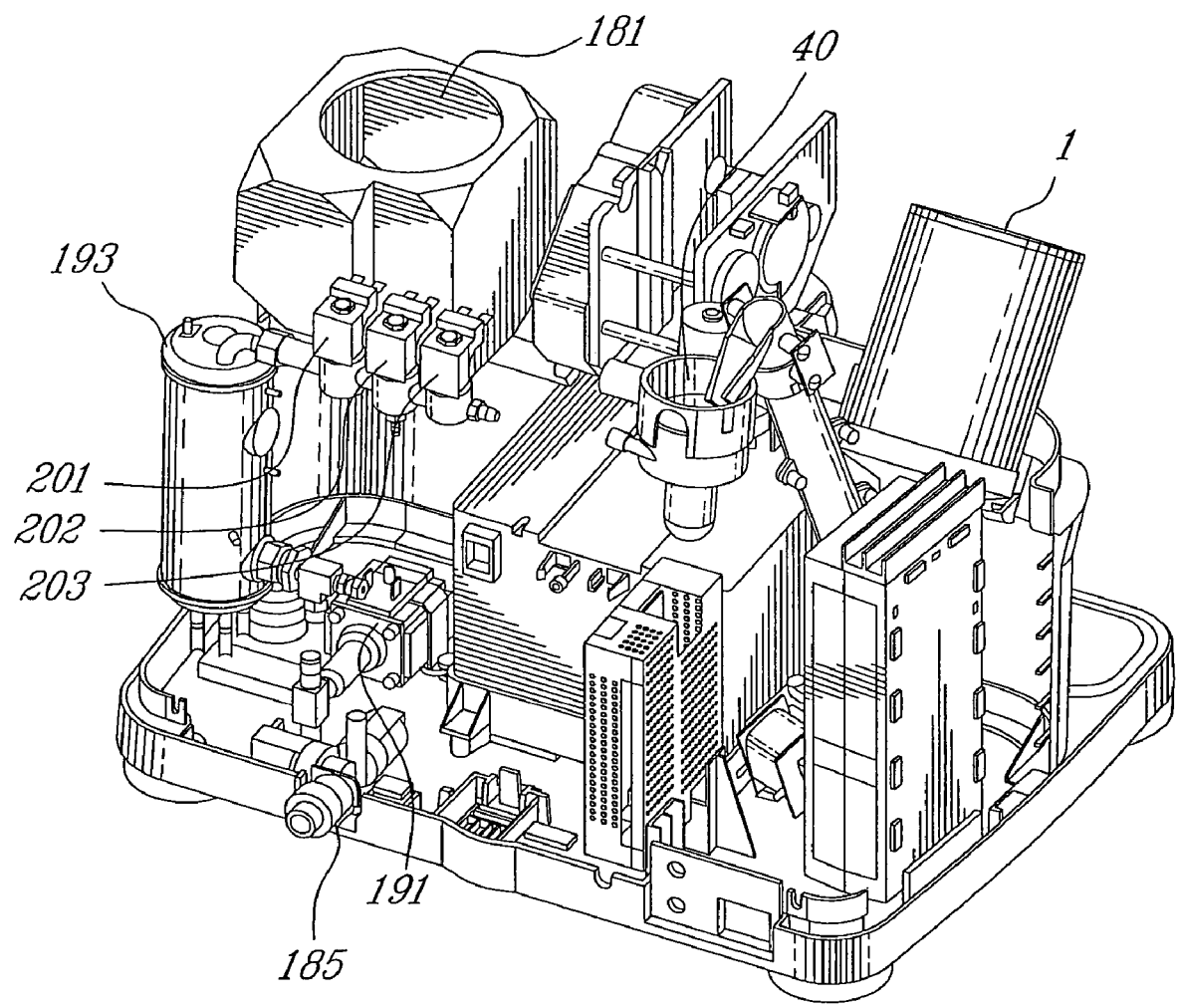
FIG. 27 is a schematic perspective rear side view of the coffee machine shown in FIG. 26 (outer housing removed)

A mixing station may include a mixing chamber, such as shown in FIGS. 26 to 28, for mixing hot water with a milk powder substance. The milk powder may, for example, be delivered to the mixing chamber by a conveyance assembly as described herein. The hydrated milk powder may be sent or conveyed to a downstream chamber 210 (see FIG. 28) for foaming of the aqueous milk material and then be conveyed by suitable conduit means 212 (see FIG. 28) to the dispensing station.

A dispensing station may comprise a support for a beverage receptacle (receptacle not shown), having disposed above such receptacle support a number of outlets of fluid conduits for respectively delivering hot coffee, hot (whipped) milk substance, hot water, etc. to a beverage receptacle (e.g., cup); (e.g., the dispensing station may comprise a drainage outlet tube from the brewing chamber or from a whipped milk station, the tube having a lower end for discharging a brewed beverage, milk, etc. therefrom). A possible type of dispensing station is shown in FIGS. 24 and 26, the support for the receptacle being shown in FIG. 26 just below the selection element 121. As mentioned above and as shown in FIG. 24, the rotary selection element 121 may be disposed adjacent the dispensing station with the outlets of the fluid conduits disposed in the annular opening defined by the rotary selection element (see FIG. 24).

A predetermined hot water dispensing cycle as controlled by the electronic controller element thus comprises energization of the pump for the displacement of water from the hot water heater through a selected valve of said valve assembly to a predetermined station.

The three valves may be selectively controlled by the controller element 199. Thus, for example, when valve 201 is energized, so as to establish a fluid connection with the brewing station, there is no fluid communication between the other valves and their respective stations; vice-versa for the other valves. Depending on the sequence of hot water dispensing through the valves it is possible to make the following coffee beverages, a simple espresso by energization of valve 201 alone;

a cappuccino by energization of valve 203 for preparation of milk substance followed by activation of valve 201 for preparation of espresso which are sequentially delivered to a receptacle at the dispensing station;

an americano by energization of valve 201 for preparation of espresso delivered to a receptacle at the dispensing station followed by activation of valve 202 for delivery of hot water to the receptacle at the dispensing station; and a latte by energization of valve 201 for preparation of espresso followed by activation of valve 203 for preparation of foamed milk substance which are sequentially delivered to a receptacle at the dispensing station.

The hot water dispenser assembly comprises a fluid conduit component comprising a plurality of conduit elements for fluid communication between the hot water heater and each of the valves.

The hot water dispenser assembly may also, if so desired or needed, include a malfunction sensing component for sensing the absence of water in the fluid conduit component (i.e., lack of water being indicative of a malfunction in the hot water system) (i.e., indicative of lack of sufficient water in heater and/or pump due to a water leak etc.) signal. For the example, in the hot water system shown, the conduit elements are of a plastic type material which is a non-conductor of electricity. On the other hand, the bodies of the valves are metallic and thus are electrically conductive. The body of valve and of valve are connected to a water detector which comprises a signal generator; the generator may be of any suitable (known) type keeping in mind its function. The water present in the conduit between the valves acts as a signal conductor such that if no water is present the signal link between the valves will be broken. The water detector also includes a signal detection element configured (in any suitable way) to detect the absence such signal and in such case generate a further (electric) signal indicative of the absence of water, this further signal being sent to an LED so as to alert the user of the assembly; alternatively the further signal may be sent to the controller means to disconnect the pump and electric heater form the power source since the operation of these elements in the absence of water could lead to their damage.

A beverage machine may, as mentioned if desired, incorporate one or more of the systems or parts thereof as described herein. Please see, for example FIGS. 26 and 27, wherein an example combination is shown, wherein like reference numbers have been used to designate like elements mentioned with respect to the previous figures.

We claim:

1. A particulate storage cartridge comprising:
    a case element defining a storage space for containing a particulate substance, said case element having an opening in communication with said storage space for the outflow of said particulate substance from said storage space and
    a detachable valved lid element
        said case element and said lid element being configured such that said lid element is removably attached to said case element so as to cover said opening such that said case element and said lid element form an enclosed chamber for containing said particulate substance,
        said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed storage space through said outflow aperture and when said plug element is in said open position particulate material is able to flow out of said storage space through said outflow aperture, said bias element biasing said plug element in said closed position and
    wherein said storage cartridge further comprises an orientation guide means.

2. A storage cartridge as defined in claim 1 wherein said storage space contains a particulate substance.

3. A storage cartridge as defined in claim 1 wherein said storage space contains a particulate milk substance.

4. A storage cartridge as defined in claim 1 comprising a valve plug interaction element for releasably maintaining said plug in said open position.

5. A particulate storage cartridge comprising:
    a case element defining a storage space for containing a particulate substance, said case element having an opening in communication with said storage space for the outflow of said particulate substance from said storage space and
    a detachable valved lid element
        said case element and said lid element being configured such that said lid element is removably attached to said case element so as to cover said opening such that said case element and said lid element form an enclosed chamber for containing said particulate substance,
        said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed storage space through said outflow aperture and when said plug element is in said open position particulate material is able to flow out of said storage space through said outflow aperture, said bias element biasing said plug element in said closed position, said valve member being a valved spout member and
    wherein said storage cartridge further comprises an orientation guide means.

6. A storage cartridge as defined in claim 5 wherein said storage space contains a particulate substance.

7. A storage cartridge as defined in claim 5 wherein said storage space contains a particulate milk substance.

8. A storage cartridge as defined in claim 5 comprising a valve plug interaction element for releasably maintaining said plug in said open position.

9. A particulate storage cartridge comprising:
    a case element defining a storage space for containing a particulate substance, said case element having an opening in communication with said storage space for the outflow of said particulate substance from said storage space and
    a detachable valved lid element
        said case element and said lid element being configured such that said lid element is removably attached to said case element so as to cover said opening such that said case element and said lid element form an enclosed chamber for containing said particulate substance,
        said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said storage space through said outflow aperture and when said plug element is in said open position particulate material is able to flow out of said storage space through said outflow aperture, said bias element biasing said plug element in said closed position and wherein said lid element further comprises an orientation guide means.

10. A storage cartridge as defined in claim 9 wherein said storage space contains a particulate substance.

11. A storage cartridge as defined in claim 9 wherein said storage space contains a particulate milk substance.

12. A storage cartridge as defined in claim 9 comprising a valve plug interaction element for releasably maintaining said plug in said open position.

13. A particulate storage cartridge comprising:

a case element defining a storage space for containing a particulate substance, said case element having an opening in communication with said storage space for the outflow of said particulate substance from said storage space and a detachable valved lid element said case element and said lid element being configured such that said lid element is removably attached to said case element so as to cover said opening such that said case element and said lid element form an enclosed chamber for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said storage space through said outflow aperture and when said plug element is in said open position particulate material is able to flow out of said enclosed chamber through said outflow aperture, said bias element biasing said plug element in said closed position, said valve member being a valved spout member and wherein said lid element further comprises an orientation guide means.

14. A storage cartridge as defined in claim 13 wherein said storage space contains a particulate substance.

15. A storage cartridge as defined in claim 13 wherein said storage space contains a particulate milk substance.

16. A storage cartridge as defined in claim 13 comprising a valve plug interaction element for releasably maintaining said plug in said open position.

17. A particulate storage cartridge comprising:

a case element defining a storage space for containing a particulate substance, said case element having an opening in communication with said storage space for the outflow of said particulate substance from said storage space and a detachable valved lid element said case element and said lid element being configured such that said lid element is removably attached to said case element so as to cover said opening such that said case element and said lid element form an storage space for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said storage space through said outflow aperture and when said plug element is in said open position particulate material is able to flow out of said storage space through said outflow aperture, said bias element biasing said plug element in said closed position and wherein said lid element further comprises an orientation guide projection.

18. A storage cartridge as defined in claim 17 wherein said storage space contains a particulate substance.

19. A storage cartridge as defined in claim 17 wherein said storage space contains a particulate milk substance.

20. A storage cartridge as defined in claim 17 comprising a valve plug interaction element for releasably maintaining said plug in said open position.

21. A particulate storage cartridge comprising:

a case element defining a storage space for containing a particulate substance, said case element having an opening in communication with said storage space for the outflow of said particulate substance from said storage space and a detachable valved lid element said case element and said lid element being configured such that said lid element is removably attached to said case element so as to cover said opening such that said case element and said lid element form an storage space for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said storage space through said outflow aperture and when said plug element is in said open position particulate material is able to flow out of said storage space through said outflow aperture, said bias element biasing said plug element in said closed position, said valve member being a valved spout member and wherein said lid element further comprises an orientation guide projection.

22. A storage cartridge as defined in claim 21 wherein said storage space contains a particulate substance.

23. A storage cartridge as defined in claim 21 wherein said storage space contains a particulate milk substance.

24. A storage cartridge as defined in claim 21 comprising a valve plug interaction element for releasably maintaining said plug in said open position.

25. A detachable valved lid element for covering an opening of a case element, said case element defining a storage space for containing a particulate substance, said opening of said case element being in communication with said storage space for the outflow of said particulate substance from said storage space said lid element being configured to co-operate with said case element such that said lid element is removably attachable to said case element so as to cover said opening such that said case element and said lid element form a storage cartridge having an enclosed chamber for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed space through said outflow aperture and when said plug element is in said open position particulate material is able to flow out of said storage space through said outflow aperture, said bias element biasing said plug element in said closed position and wherein said lid element comprises an orientation guide means.

26. A detachable valved lid element for covering an opening of a case element, said case element defining a storage space for containing a particulate substance, said opening of said case element being in communication with said storage space for the outflow of said particulate substance from said storage space said lid element being configured to co-operate with said case element such that said lid element is removably attachable to said case element so as to cover said opening such that said case element and said lid element form a storage cartridge having an enclosed chamber for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed space through said outflow aperture and when said plug element is in said open position particulate material is able to flow out of said storage space through said outflow aperture, said bias element biasing said plug element in said closed position and wherein said lid element comprises an orientation guide projection.

27. A detachable valved lid element for covering an opening of a case element, said case element defining a storage space for containing a particulate substance, said opening of said case element being in communication with said storage space for the outflow of said particulate substance from said storage space said lid element being configured to co-operate with said case element such that said lid element is removably attachable to said case element so as to cover said opening such that said case element and said lid element form a storage cartridge having an enclosed chamber for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed space through said outflow aperture and when said plug element is in said open position particulate material is able to flow out of said storage space through said outflow aperture, said bias element biasing said plug element in said closed position, said valve member being a valved spout member and wherein said lid element comprises an orientation guide means.

28. A detachable valved lid element for covering an opening of a case element, said case element defining a storage space for containing a particulate substance, said opening of said case element being in communication with said storage space for the outflow of said particulate substance from said storage space said lid element being configured to co-operate with said case element such that said lid element is removably attachable to said case element so as to cover said opening such that said case element and said lid element form a storage cartridge having an enclosed chamber for containing said particulate substance, said lid element comprising a valve member having an outflow aperture and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed space through said outflow aperture and when said plug element is in said open position particulate material is able to flow out of said storage space through said outflow aperture, said bias element biasing said plug element in said closed position, said valve member being a valved spout member and wherein said lid element comprises an orientation guide projection.

29. A particulate storage cartridge comprising a case element defining a storage space for containing a particulate substance, said case element having an opening in communication with said storage space for the outflow of said particulate substance from said storage space and a detachable valved lid element said case element and said lid element being configured such that said lid element is removably attached to said case element so as to cover said opening such that said case element and said lid element form an enclosed chamber for containing said particulate substance, said lid element comprising a valve member having an outflow aperture, and defining a flow path for the flow of particulate material out of said storage space, said valve member further comprising a plug element and a bias component, said plug element and said bias component being configured such that said plug element is displaceable between a closed position and an open position whereby when said plug element is in said closed position said plug closes off said outflow aperture whereby particulate material is unable to flow out of said enclosed storage space through said outflow aperture and when said plug element is in said open position particulate material is able to flow out of said storage space through said outflow aperture, said bias element biasing said plug element in said closed position, said valve member being a valved spout member.

30. A storage cartridge as defined in claim 29 wherein said storage space contains a particulate substance.

31. A storage cartridge as defined in claim 29 wherein said storage space contains a particulate milk substance.

32. A storage cartridge as defined in claim 29 comprising a valve plug interaction element for releasably maintaining said plug in said open position.

* * * * *